(12) United States Patent
Ren

(10) Patent No.: US 12,040,699 B2
(45) Date of Patent: Jul. 16, 2024

(54) CONTROL SYSTEM AND METHOD FOR DRIVE CONTROLLER AND POWER FACTOR CORRECTION CIRCUIT

(71) Applicant: Huawei Digital Power Technologies Co., Ltd., Shenzhen (CN)

(72) Inventor: Jie Ren, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 218 days.

(21) Appl. No.: 17/862,462

(22) Filed: Jul. 12, 2022

(65) Prior Publication Data

US 2023/0029207 A1 Jan. 26, 2023

(30) Foreign Application Priority Data

Jul. 15, 2021 (CN) .......................... 202110800307.X

(51) Int. Cl.
  *H02M 1/42* (2007.01)
  *H02M 1/00* (2006.01)
  *H02M 1/08* (2006.01)

(52) U.S. Cl.
  CPC ....... *H02M 1/4233* (2013.01); *H02M 1/0009* (2021.05); *H02M 1/08* (2013.01)

(58) Field of Classification Search
  CPC .... H02M 1/4233; H02M 1/0009; H02M 1/08; H02M 1/4208
  See application file for complete search history.

(56) References Cited

U.S. PATENT DOCUMENTS

| | | | |
|---|---|---|---|
| 8,232,786 B2* | 7/2012 | Phadke | H02M 1/4225 323/283 |
| 11,923,769 B2* | 3/2024 | Chin | H02M 1/4233 |
| 2005/0007715 A1 | 1/2005 | Mukai et al. | |
| 2008/0037807 A1 | 2/2008 | Honda | |
| 2011/0013436 A1* | 1/2011 | Gan | H02M 1/4225 363/126 |
| 2018/0226877 A1 | 8/2018 | Fukumoto | |
| 2019/0326899 A1 | 10/2019 | Nakamura et al. | |
| 2022/0345034 A1* | 10/2022 | Chin | H02M 1/4233 |
| 2024/0072647 A1* | 2/2024 | Chin | H02M 3/158 |

(Continued)

FOREIGN PATENT DOCUMENTS

| | | |
|---|---|---|
| CN | 101860189 A | 10/2010 |
| CN | 101999204 A | 3/2011 |
| CN | 102106069 A | 6/2011 |

(Continued)

*Primary Examiner* — Adolf D Berhane
(74) *Attorney, Agent, or Firm* — Maier & Maier, PLLC

(57) ABSTRACT

A drive controller is used in a control system of a power factor correction (PFC) circuit. The control system further includes the PFC circuit. The PFC circuit includes a first bridge arm, a second bridge arm, a first switching transistor, and a second switching transistor. The driving controller includes a sampling circuit and a driving circuit. The sampling circuit is configured to obtain a target current value between the first switching transistor and the second switching transistor. The drive circuit is configured to turn off gate inputs of the first switching transistor and the second switching transistor when the target current value is greater than a current threshold, to turn off the first switching transistor and the second switching transistor and protect the control system.

18 Claims, 10 Drawing Sheets

(56) References Cited

U.S. PATENT DOCUMENTS

2024/0072649 A1\* 2/2024 Chin ................ H02M 1/32

FOREIGN PATENT DOCUMENTS

| | | |
|---|---|---|
| CN | 103138557 A | 6/2013 |
| CN | 103647462 A | 3/2014 |
| CN | 108346655 A | 7/2018 |
| CN | 211377892 U | 8/2020 |
| CN | 112202330 A | 1/2021 |
| JP | 2020014045 A | 1/2020 |
| WO | 2013078856 A1 | 6/2013 |
| WO | 2017183202 A1 | 10/2017 |

\* cited by examiner

CONTROL SYSTEM AND METHOD FOR DRIVE CONTROLLER AND POWER FACTOR CORRECTION CIRCUIT

CROSS-REFERENCE TO RELATED APPLICATION

This application claims priority to Chinese Patent Application No. 202110800307.X, filed on Jul. 15, 2021, which is hereby incorporated by reference in its entirety.

TECHNICAL FIELD

The embodiments relate to the field of power electronics technologies, a control system and method for a drive controller, and a power factor correction circuit.

BACKGROUND

In the field of power electronics technologies, to reduce a loss caused by a rectifier bridge in a conventional power factor correction (PFC) circuit, a bridgeless PFC circuit is usually used to perform power factor correction. In a common bridgeless PFC circuit, as shown in FIG. 1, a bridgeless PFC circuit with a bidirectional switch circuit needs only one power inductor and two switching transistors switched on and off simultaneously. Therefore, the bridgeless PFC circuit has a simple control principle, and is widely used. Generally, to protect a power component in a circuit, a peak current of a switch circuit in a PFC circuit usually needs to be sampled, to perform overcurrent protection on the PFC circuit.

In a research and practice process, for the bridgeless PFC circuit with a bidirectional switch, the peak current of the switch circuit may be detected through a transformer or a current detection chip (for example, a Hall current detection chip) in the conventional technology. However, a size of the transformer is large, and a reset circuit and a current shaping circuit need to be added. This is not conducive to miniaturization. A response speed of the current detection chip is slow, and an additional power supply circuit is required. In addition to increasing static loss of the circuit, circuit complexity and design costs are also increased.

SUMMARY

The embodiments provide a control system and method for a drive controller and a power factor correction circuit, so that the drive controller disconnects a PFC circuit when detecting that an internal current of the PFC circuit is large, thereby protecting a component in the PFC circuit, reducing a quantity of components in a detection circuit, and reducing design costs and energy loss.

According to a first aspect, the embodiments may provide a drive controller, where the drive controller is applicable to a control system of a PFC circuit. The control system further includes a power factor correction PFC circuit. The PFC circuit includes a first bridge arm, a second bridge arm, a first switching transistor, and a second switching transistor. The drive controller includes a sampling circuit and a drive circuit. The first bridge arm and the second bridge arm are connected in parallel and connected to a load. A first bridge arm midpoint of the first bridge arm is connected to a power supply and a drain electrode of the first switching transistor. A drain electrode of the second switching transistor is connected to a second bridge arm midpoint of the second bridge arm. A source electrode of the first switching transistor is connected to a source electrode of the second switching transistor and the sampling circuit. A gate electrode of the first switching transistor and a gate electrode of the second switching transistor are connected in parallel to the drive circuit. The sampling circuit is connected to the drive circuit. The sampling circuit is configured to obtain a target current value between the first switching transistor and the second switching transistor. The drive circuit is configured to turn off gate inputs of the first switching transistor and the second switching transistor when the target current value is greater than a current threshold, to turn off the first switching transistor and the second switching transistor, thereby protecting the control system.

In an implementation, the drive controller may obtain the target current value between the first switching transistor and the second switching transistor through the sampling circuit. When a current is excessively high, the gate inputs of the first switching transistor and the second switching transistor may be turned off through the drive circuit (for example, a gate voltage is decreased or a gate current is cut oft), to turn off the first switching transistor and the second switching transistor, thereby protecting a component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component.

With reference to the first aspect, in a first possible implementation, the sampling circuit is configured to obtain a first target current value from the first switching transistor to the second switching transistor. The drive circuit is configured to turn off the gate inputs of the first switching transistor and the second switching transistor when the first target current value is greater than a first current threshold. It may be understood that the drive controller may obtain the first target current value between the first switching transistor and the second switching transistor through the sampling circuit. In other words, the drive controller may detect the first target current value in a period in which a current flows from the first switching transistor to the second switching transistor. When the first target current value is excessively large (that is, exceeds the first target current value), the drive controller may turn off the gate inputs of the first switching transistor and the second switching transistor through the drive circuit (for example, decrease the gate voltage or cut off the gate current), to turn off the first switching transistor and the second switching transistor, thereby protecting the component in the control system when the first target current is excessively large. In addition, the drive controller sets the first current threshold for the detected first target current, so that control precision and applicability of the drive controller can be improved.

With reference to the first aspect or the first possible implementation of the first aspect, in a second possible implementation, the sampling circuit is configured to obtain a second target current value from the second switching transistor to the first switching transistor. The drive circuit is configured to turn off the gate inputs of the first switching transistor and the second switching transistor when the second target current value is greater than a second current threshold. It may be understood that the drive controller may obtain the second target current value between the second switching transistor and the first switching transistor through the sampling circuit. In other words, the second target current value may be detected in half a period in which a current flows from the second switching transistor to the first switching transistor. When the second target current value is excessively large (that is, exceeds the second target current value), the drive controller may turn off the gate inputs of the first switching transistor and the second switching transistor through the drive circuit (for example, decrease the gate voltage or cut off the gate current), to turn off the first switching transistor and the second switching transistor, thereby protecting the component in the control system when the second target current is excessively large. In addition, the drive controller sets the second current threshold for the detected second target current, so that the control precision and the applicability of the drive controller can be improved.

With reference to the first aspect, the first possible implementation of the first aspect, or the second possible implementation of the first aspect, in a third possible implementation, a first connection end of the sampling circuit is connected to the drain electrode of the first switching transistor. A second connection end of the sampling circuit is connected to the source electrode of the first switching transistor and the source electrode of the second switching transistor. A third connection end of the sampling circuit is connected to the drain electrode of the second switching transistor. The sampling circuit is configured to collect a first target voltage between the drain electrode of the first switching transistor and the source electrode of the first switching transistor and collect a second target voltage between the drain electrode of the second switching transistor and the source electrode of the second switching transistor, to obtain the target current value between the first switching transistor and the second switching transistor. The drive circuit is configured to: when the first target voltage is greater than a first voltage threshold, or the second target voltage is greater than a second voltage threshold, determine that the target current value is greater than a current threshold, and turn the off gate inputs of the first switching transistor and the second switching transistor.

In an implementation, the drive controller may obtain, through the sampling circuit, the first target voltage between the drain electrode of the first switching transistor and the source electrode of the first switching transistor, and the second target voltage between the drain electrode of the second switching transistor and the source electrode of the second switching transistor, to obtain the target current value (that is, a ratio of the first target voltage between the drain electrode of the first switching transistor and the source electrode of the first switching transistor to an internal resistance value of the first switching transistor, and a ratio of the second target voltage between the drain electrode of the second switching transistor and the source electrode of the second switching transistor to an internal resistance of the second switching transistor). When the first target voltage is greater than the first voltage threshold, or the second target voltage is greater than the second voltage threshold, the drive controller may turn off the gate inputs of the first switching transistor and the second switching transistor through the drive circuit (for example, decrease the gate voltage or cut off the gate current), to turn off the first switching transistor and the second switching transistor, thereby protecting the component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the first target voltage between the drain electrode of the first switching transistor and the source electrode of the first switching transistor, and the second target voltage between the drain electrode of the second switching transistor and the source electrode of the second switching transistor, to obtain the target current value. This enriches a detection capability of the drive controller and improves applicability of the drive controller.

With reference to any one of the first aspect or the first possible implementation of the first aspect to the third possible implementation of the first aspect, in a fourth possible implementation, the control system further includes a first detection resistor. The source electrode of the first switching transistor is connected to the source electrode of the second switching transistor through the first detection resistor. The first connection end of the sampling circuit is connected to the source electrode of the first switching transistor. The second connection end of the sampling circuit is connected to the source electrode of the second switching transistor. The sampling circuit is configured to collect a voltage between the source electrode of the first switching transistor and the source electrode of the second switching transistor, to obtain the target current value between the first switching transistor and the second switching transistor. The drive circuit is configured to: when the voltage between the source electrode of the first switching transistor and the source electrode of the second switching transistor is greater than a third voltage threshold, determine that the target current value is greater than the current threshold, and turn off the gate inputs of the first switching transistor and the second switching transistor.

In an implementation, the drive controller may obtain, through the sampling circuit, the voltage between the source electrode of the first switching transistor and the source electrode of the second switching transistor, to obtain the target current value (that is, a ratio of a voltage value between the source electrode of the first switching transistor and the source electrode of the second switching transistor to a resistance value of the first detection resistor). When the voltage is excessively high (that is, greater than the third voltage threshold), the drive controller may turn off the gate inputs of the first switching transistor and the second switching transistor through the drive circuit (for example, decrease the gate voltage or cut off the gate current), to turn off the first switching transistor and the second switching transistor, thereby protecting the component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the voltage between the source electrode of the first switching transistor and the source electrode of the second switching transistor, to obtain the target current value. This enriches the detection capability of the drive controller and improves the applicability of the drive controller.

With reference to the first aspect or any one of the first possible implementation of the first aspect to the third possible implementation of the first aspect, in a fifth possible implementation, the control system further includes a second detection resistor and a third detection resistor. The source electrode of the first switching transistor is connected to the source electrode of the second switching transistor through the second detection resistor and the third detection resistor that are connected in series. The first connection end of the sampling circuit is connected to the source electrode of the first switching transistor. The second connection end of the sampling circuit is connected to a series connection point of the second detection resistor and the third detection resistor. The third connection end of the sampling circuit is connected to the source electrode of the second switching transistor. The sampling circuit is configured to collect a third target voltage between the source electrode of the first switching transistor and the series connection point and collect a fourth target voltage between the source electrode of the second switching transistor and the series connection point, to obtain the target current value between the first switching transistor and the second switching transistor. The drive circuit is configured to: when the third target voltage is greater than a fourth voltage threshold, or the fourth target voltage is greater than a fifth voltage threshold, determine that the target current value is greater than the current threshold, and turn off the gate inputs of the first switching transistor and the second switching transistor.

In an implementation, the drive controller may obtain, through the sampling circuit, the third target voltage between the source electrode of the first switching transistor and the series connection point, and the fourth target voltage between the source electrode of the second switching transistor and the series connection point, to obtain the target current value (that is, a ratio of the third target voltage between the source electrode of the first switching transistor and the series connection point to a resistance value of the second detection resistance, and a ratio of the fourth target voltage between the source electrode of the second switching transistor and the series connection point to a resistance value of the third detection resistance). When the third target voltage is greater than the fourth voltage threshold, or the fourth target voltage is greater than the fifth voltage threshold, the drive controller may turn off the gate inputs of the first switching transistor and the second switching transistor through the drive circuit (for example, decrease the gate voltage or cut off the gate current), to turn off the first switching transistor and the second switching transistor, thereby protecting the component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the third target voltage between the source electrode of the first switching transistor and the series connection point, and the fourth target voltage between the source electrode of the second switching transistor and the series connection point, to further obtain the target current value. This enriches the detection capability of the drive controller and improves the applicability of the drive controller.

With reference to the first aspect or any one of the first possible implementation of the first aspect to the fifth possible implementation of the first aspect, in a sixth possible implementation, the first switching transistor and the second switching transistor include a metal oxide semiconductor field effect transistor (MOSFET), a gallium nitride transistor GaN HEMT, or an insulated gate bipolar transistor (IGBT). This enriches components selections and application scenarios of the drive controller.

According to a second aspect, the embodiments may provide a switch drive controller of a power factor correction PFC circuit, where the switch drive controller includes a PFC controller and the drive controller provided in any one of the first aspect to the fifth possible implementation of the first aspect, and the PFC controller is connected to the PFC circuit and the drive controller. The PFC controller is configured to provide a drive signal for the drive controller, to control the drive controller to work. In implementations, when the PFC circuit works, a drive voltage required by the drive controller is floating with respect to ground. The switch drive controller may provide the drive signal for the drive controller through the PFC controller, to control the drive controller, thereby ensuring that the drive controller works normally. In addition, because the PFC controller is connected to the PFC circuit, a dynamic drive voltage may be provided for the drive controller in real time through the PFC controller, thereby reducing a quantity of components used to detect the drive voltage and provide the drive signal and reducing design costs and energy loss.

According to a third aspect, the embodiments may provide a control system for a power factor correction circuit. The control system includes a power factor correction PFC circuit, a PFC controller, and the drive controller according to any one of the first aspect to the fifth possible implementation of the first aspect. The PFC circuit includes a first bridge arm, a second bridge arm, a first switching transistor, and a second switching transistor, where the first bridge arm and the second bridge arm are connected in parallel and connected to a load. A first bridge arm midpoint of the first bridge arm is connected to a power supply and a drain electrode of the first switching transistor. A drain electrode of the second switching transistor is connected to a second bridge arm midpoint of the second bridge arm. A source electrode of the first switching transistor is connected to a source electrode of the second switching transistor and the sampling circuit. A gate electrode of the first switching transistor and a gate electrode of the second switching transistor are connected in parallel to a drive circuit. Herein, the PFC controller is connected to the PFC circuit and the drive controller and is configured to provide a drive signal for the drive controller, to control the drive controller to work.

In an implementation, when a current between the first switching transistor and the second switching transistor is excessively high, the control system may turn off gate inputs of the first switching transistor and the second switching transistor through the drive controller (for example, decrease a gate voltage or cut off a gate current), to turn off the first switching transistor and the second switching transistor, thereby protect a component in the control system when the current is excessively high. In addition, when the PFC circuit in the control system works, a drive voltage required by the drive controller is floating with respect to the ground. The control system may provide the drive signal for the drive controller through the PFC controller, to control the drive controller, thereby ensuring that the drive controller works normally. It may be understood that the control system integrates a sampling function and a driving function into the drive controller, thereby reducing a quantity of components used to detect a target current and on and off states of a switching transistor. It may be further understood that the control system integrates a sampling function and a driving function into the drive controller, thereby reducing a quantity of components used to detect a target current and on and off states of a switching transistor. Design costs and energy loss of the control system can be reduced, and a service life of a circuit component can be prolonged.

With reference to the third aspect, in a first possible implementation, the control system further includes an inductor and a capacitor. The first bridge arm midpoint of the first bridge arm is connected to a first connection end of the power supply through the inductor. A second connection end of the power supply is connected to the second bridge arm midpoint of the second bridge arm. The second bridge arm is connected to the capacitor in parallel and connected to the load. Herein, the inductor and the capacitor are used to rectify and filter a current in the control system, so that a reactive power loss of electric energy in the control system can be reduced, to improve energy utilization.

According to a fourth aspect, the embodiments may provide a power factor correction circuit control method. The control method is applicable to the drive controller provided in any one of the first aspect to the fifth possible implementation of the first aspect, and the method includes the following steps.

The drive controller obtains a target current value between a first switching transistor and a second switching transistor. When the target current is greater than a current threshold, the drive controller turns off gate inputs of the first switching transistor and the second switching transistor to turn off the first switching transistor and the second switching transistor, thereby protecting a control system.

In an implementation, the drive controller may obtain the target current value between the first switching transistor and the second switching transistor. When the current is excessively high, the gate inputs of the first switching transistor and the second switching transistor may be turned off (for example, a gate voltage is decreased or a gate current is cut off), to turn off the first switching transistor and the second switching transistor, thereby protecting a component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component.

With reference to the fourth aspect, in a first possible implementation, the method further includes the following steps.

The drive controller obtains a first target current value from the first switching transistor to the second switching transistor. When the first target current value is greater than a first current threshold, the drive controller turns off the gate inputs of the first switching transistor and the second switching transistor. It may be understood that the drive controller may obtain the first target current value between the first switching transistor and the second switching transistor. In other words, the drive controller may detect the first target current value in half a period in which a current flows from the first switching transistor to the second switching transistor. When the first target current value is excessively large (that is, exceeds the first target current value), the drive controller may turn off the gate inputs of the first switching transistor and the second switching transistor (for example, decrease the gate voltage or cut off the gate current), to turn off the first switching transistor and the second switching transistor, thereby protecting the component in the control system when the first target current is excessively large. In addition, the drive controller sets the first current threshold for the detected first target current, so that control precision and applicability of the drive controller can be improved.

With reference to the fourth aspect or the first possible implementation of the fourth aspect, in a second possible implementation, the method further includes the following steps.

The drive controller obtains a second target current value from the second switching transistor to the first switching transistor. When the second target current value is greater than a second current threshold, the drive controller turns off the gate inputs of the first switching transistor and the second switching transistor. It may be understood that the drive controller may obtain the second target current value between the second switching transistor and the first switching transistor. In other words, the second target current value may be detected in half a period in which a current flows from the second switching transistor to the first switching transistor. When the second target current value is excessively large (that is, exceeds the second target current value), the drive controller may turn off the gate inputs of the first switching transistor and the second switching transistor (for example, decrease the gate voltage or cut off the gate current), to turn off the first switching transistor and the second switching transistor, thereby protecting the component in the control system when the second target current is excessively large. In addition, the drive controller sets the second current threshold for the detected second target current, so that the control precision and the applicability of the drive controller can be improved.

With reference to the fourth aspect, the first possible implementation of the fourth aspect, or the second possible implementation of the fourth aspect, in a third possible implementation, the method further includes the following steps.

The drive controller collects a first target voltage between a drain electrode of the first switching transistor and a source electrode of the first switching transistor and collects a second target voltage between a drain electrode of the second switching transistor and a source electrode of the second switching transistor, to obtain the target current value between the first switching transistor and the second switching transistor. When the target voltage is greater than a first voltage threshold, or the second target voltage is greater than a second voltage threshold, the drive controller determines that the target current value is greater than a current threshold and turns off the gate inputs of the first switching transistor and the second switching transistor.

In an implementation, the drive controller may obtain the first target voltage between the drain electrode of the first switching transistor and the source electrode of the first switching transistor, and the second target voltage between the drain electrode of the second switching transistor and the source electrode of the second switching transistor, to obtain the target current value (that is, a ratio of the first target voltage between the drain electrode of the first switching transistor and the source electrode of the first switching transistor to an internal resistance value of the first switching transistor, and a ratio of the second target voltage between the drain electrode of the second switching transistor and the source electrode of the second switching transistor to an internal resistance of the second switching transistor). When the first target voltage is greater than the first voltage threshold, or the second target voltage is greater than the second voltage threshold, the drive controller may turn off the gate inputs of the first switching transistor and the second switching transistor (for example, decrease the gate voltage or cut off the gate current), to turn off the first switching transistor and the second switching transistor, thereby protect the component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the first target voltage between the drain electrode of the first switching transistor and the source electrode of the first switching transistor, and the second target voltage between the drain electrode of the second switching transistor and the source electrode of the second switching transistor, to obtain the target current value. This enriches a detection capability of the drive controller and improves applicability of the drive controller.

With reference to any one of the fourth aspect or the first possible implementation of the fourth aspect to the third possible implementation of the fourth aspect, in a fourth possible implementation, when the control system further includes a first detection resistor, the method further includes the following steps.

The drive controller collects a voltage between the source electrode of the first switching transistor and the source electrode of the second switching transistor, to obtain the target current value between the first switching transistor and the second switching transistor. When the voltage between the source electrode of the first switching transistor and the source electrode of the second switching transistor is greater than a third voltage threshold, the drive controller determines that the target current value is greater than the current threshold and turns off the gate inputs of the first switching transistor and the second switching transistor.

In an implementation, the drive controller may obtain the voltage between the source electrode of the first switching transistor and the source electrode of the second switching transistor, to obtain the target current value (that is, a ratio of a voltage value between the source electrode of the first switching transistor and the source electrode of the second switching transistor to a resistance value of a first detection resistor). When the voltage is excessively high (that is, greater than the third voltage threshold), the drive controller may turn off the gate inputs of the first switching transistor and the second switching transistor (for example, decrease the gate voltage or cut off the gate current), to turn off the first switching transistor and the second switching transistor, thereby protecting the component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the voltage between the source electrode of the first switching transistor and the source electrode of the second switching transistor, to obtain the target current value. This enriches the detection capability of the drive controller and improves the applicability of the drive controller.

With reference to any one of the fourth aspect or the first possible implementation of the fourth aspect to the third possible implementation of the fourth aspect, in a fifth possible implementation, when the control system further includes a second detection resistor and a third detection resistor, the method further includes the following steps.

The drive controller collects a third target voltage between the source electrode of the first switching transistor and a series connection point and collects a fourth target voltage between the source electrode of the second switching transistor and the series connection point, to obtain the target current value between the first switching transistor and the second switching transistor.

When the target voltage is greater than a fourth voltage threshold, or the fourth target voltage is greater than a fifth voltage threshold, the drive controller determines that the target current value is greater than the current threshold and turns off the gate inputs of the first switching transistor and the second switching transistor.

In an implementation, the drive controller may obtain the third target voltage between the source electrode of the first switching transistor and the series connection point, and the fourth target voltage between the source electrode of the second switching transistor and the series connection point, to obtain the target current value (that is, a ratio of the third target voltage between the source electrode of the first switching transistor and the series connection point to a resistance value of the second detection resistance, and a ratio of the fourth target voltage between the source electrode of the second switching transistor and the series connection point to a resistance value of the third detection resistance). When the third target voltage is greater than the fourth voltage threshold, or the fourth target voltage is greater than the fifth voltage threshold, the drive controller may turn off the gate inputs of the first switching transistor and the second switching transistor (for example, decrease the gate voltage or cut off the gate current), to turn off the first switching transistor and the second switching transistor, thereby protecting the component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the third target voltage between the source electrode of the first switching transistor and the series connection point, and the fourth target voltage between the source electrode of the second switching transistor and the series connection point, to further obtain the target current value. This enriches the detection capability of the drive controller and improves the applicability of the drive controller.

DETAILED DESCRIPTION OF THE EMBODIMENTS

A control system and method of a drive controller and a power factor correction circuit provided are applicable to different types of power-consuming equipment (for example, a power grid, a household equipment, or an industrial and commercial power-consuming equipment), may be applied to a power-consuming equipment field such as a user terminal (for example, a mobile phone, a smart device, or a television) field and an automobile field, and may be adapted to different application scenarios such as a power supply scenario for a large-scale power-consuming equipment (for example, a power grid or an industrial device), a small- and medium-sized distributed power-consuming equipment (for example, a vehicle-mounted power-consuming equipment, a household power-consuming equipment), and a mobile power-consuming equipment (for example, a mobile phone or a smart device). The following uses a power supply scenario of a household power-consuming equipment as an example for description, and details are not described again.

Figure 1:
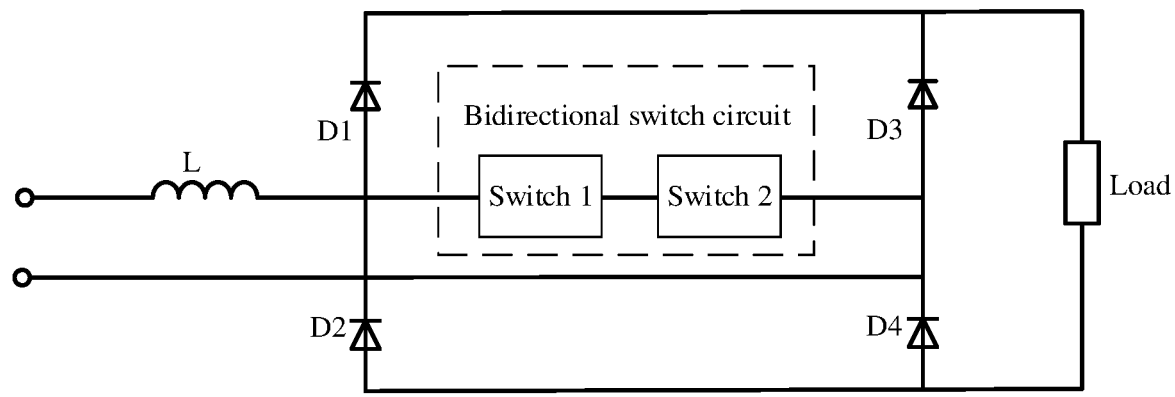
FIG. 1 is a schematic diagram of a bidirectional switch bridgeless PFC circuit according to an embodiment.
Figure 2:
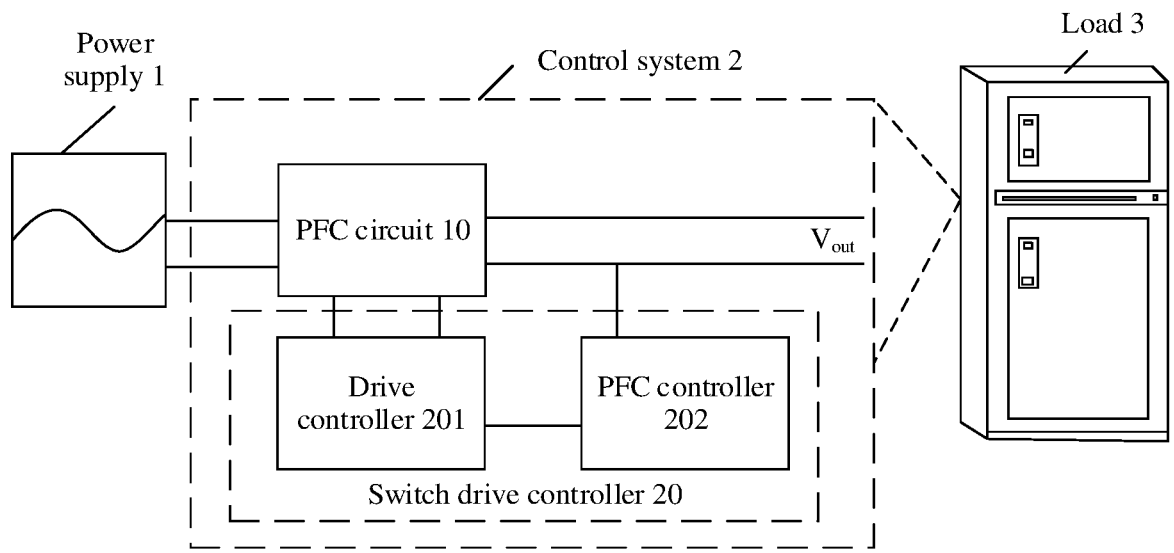
FIG. 2 is a schematic diagram of an application scenario of a control system according to an embodiment.

FIG. 2 is a schematic diagram of an application scenario of a control system according to an embodiment. As shown in FIG. 2, a power supply 1 is connected to a load 3 (that is, a power-consuming equipment) through a control system 2, and the control system 2 may convert an alternating current voltage provided by the power supply 1 into a direct current voltage and provide the direct current voltage to the load 3. The control system 2 includes a PFC circuit 10 and a switch drive controller 20. The control system 2 may convert, through the PFC circuit 10, the alternating current voltage provided by the power supply 1 into a voltage matching the load 3 (for example, a rated voltage of the load 3), so that the load 3 can work normally. The switch drive controller 20 includes a drive controller 201 and a PFC controller 202. The PFC controller 202 may provide a drive signal to the drive controller 201 based on an output voltage of the PFC circuit 10, so that the drive controller 201 works normally. A switching transistor in the PFC circuit 10 is turned on through the drive controller 201. When a current in the PFC circuit 10 is excessively high, the drive controller 201 may turn off the switching transistor in the PFC circuit 10, thereby protecting a component in the PFC circuit 10.

The drive controller 201 may be used in the control system, and the control system may further include a PFC circuit and a PFC controller. The PFC circuit may use a topology of a bidirectional switching PFC circuit, another PFC circuit, or the like in a scenario in which a switching transistor in the PFC circuit needs to be controlled to protect the PFC circuit when a current in the PFC circuit is excessively high. For ease of description, the scenario in which the bidirectional switch PFC circuit is controlled is used as an example to describe the drive controller 201 and the control system is which the drive controller 201 is used. The following describes, with reference to FIG. 3, the drive controller 201 shown in FIG. 2 and the control system in which the drive controller 201 is used.

Figure 3:
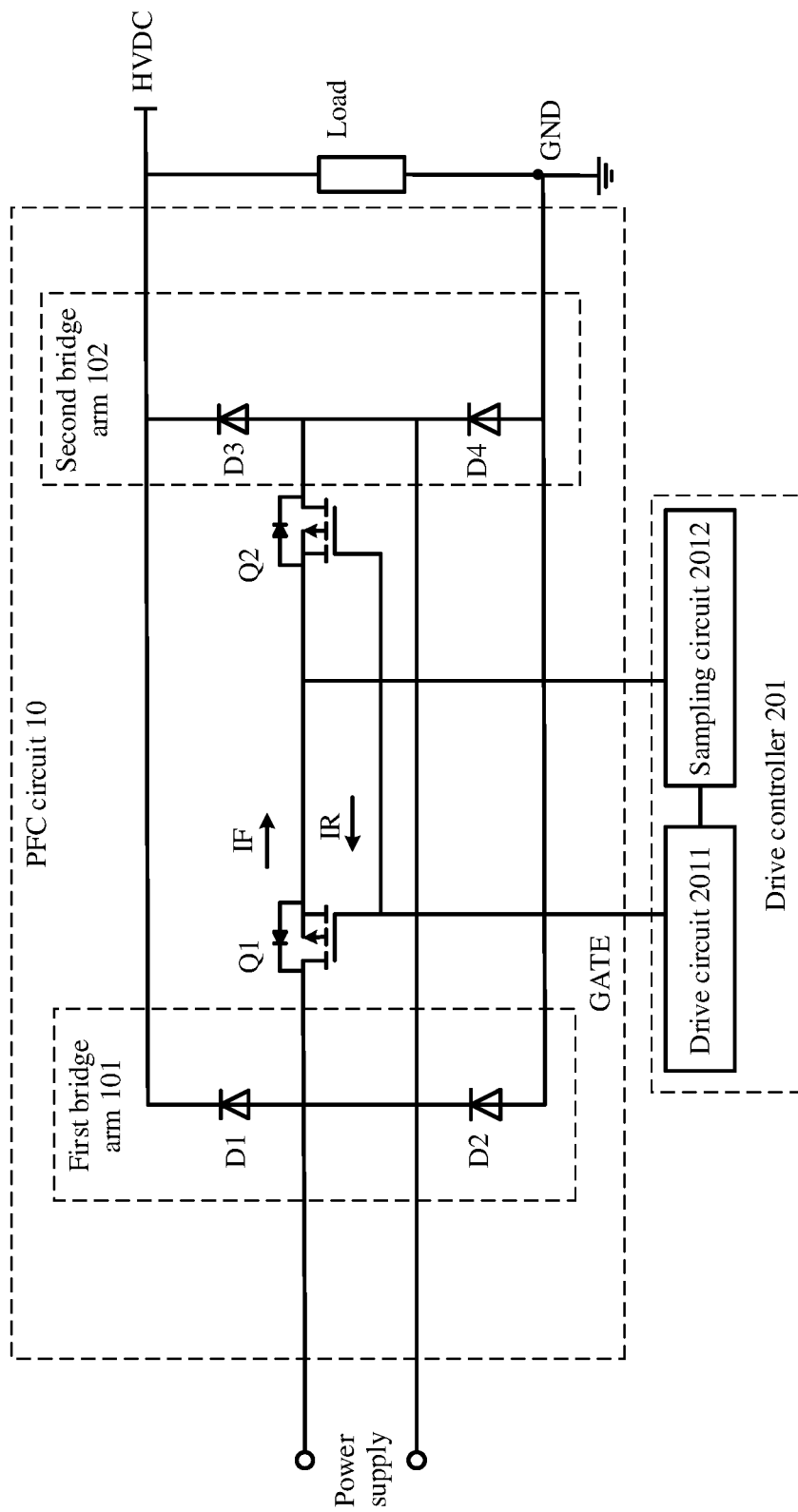
FIG. 3 is a schematic diagram of a structure of a control system according to an embodiment.

FIG. 3 is a schematic diagram of a structure of a control system according to an embodiment. The drive controller 201 is used in the control system shown in FIG. 2. The PFC circuit in the control system may convert an alternating current voltage of a power supply into a voltage matching a load and output the voltage. When a current in the PFC circuit is excessively high, the drive controller 201 may turn off a switching transistor in the PFC circuit to protect a component in the PFC circuit.

In some feasible implementations, as shown in FIG. 3, the PFC circuit 10 in the control system includes a first bridge arm 101, a second bridge arm 102, a first switching transistor Q1, and a second switching transistor Q2. The drive controller 201 includes a drive circuit 2011 and a sampling circuit 2012. The first bridge arm 101 and the second bridge arm 102 are connected in parallel and connected to a load. A first bridge arm midpoint of the first bridge arm 101 is connected to a power supply and a drain electrode of the first switching transistor Q1. A drain electrode of the second switching transistor Q2 is connected to a second bridge arm midpoint of the second bridge arm 102. A source electrode of the first switching transistor Q1 is connected to a source electrode of the second switching transistor Q2 and the sampling circuit 2012. A gate electrode of the first switching transistor Q1 and a gate electrode of the second switching transistor Q2 are connected in parallel to the drive circuit 2011. The sampling circuit 2012 in the drive controller 201 is connected to the drive circuit 2011.

Herein, the sampling circuit 2012 in the drive controller 201 may obtain a target current value between the first switching transistor Q1 and the second switching transistor Q2. The drive circuit 2011 in the drive controller 201 may turn off gate inputs of the first switching transistor Q1 and the second switching transistor Q2 when the target current value is greater than a current threshold, to turn off the first switching transistor Q1 and the second switching transistor Q2, thereby protecting the control system. In some feasible implementations, when the target current value obtained by the sampling circuit 2012 in the drive controller 201 is greater than the current threshold, the drive circuit 2011 in the drive controller 201 may decrease gate voltages of the first switching transistor Q1 and the second switching transistor Q2, or turn off gate currents of the first switching transistor Q1 and the second switching transistor Q2, to turn off the first switching transistor Q1 and the second switching transistor Q2, thereby protecting a component in the PFC circuit 10. This may be determined based on an actual application scenario and is not limited herein.

In some feasible implementations, the sampling circuit 2012 in the drive controller 201 may obtain a first target current value from the first switching transistor Q1 to the second switching transistor Q2. The drive circuit 2011 in the drive controller 201 may turn off the gate inputs of the first switching transistor Q1 and the second switching transistor Q2 when the first target current value is greater than a first current threshold (that is, IF). It may be understood that the drive controller 201 may obtain the first target current value between the first switching transistor Q1 and the second switching transistor Q2 through the sampling circuit 2012. In other words, the drive controller 201 may detect the first target current value in half a period in which a current flows from the first switching transistor Q1 to the second switching transistor Q2. When the first target current value is excessively large (that is, exceeds the first target current value), the drive controller 201 may turn off the gate inputs of the first switching transistor Q1 and the second switching transistor Q2 through the drive circuit 2011 (for example, decrease the gate voltage or cut off the gate current), to turn off the first switching transistor Q1 and the second switching transistor Q2, thereby protecting the component in the PFC circuit 10 when the first target current is excessively large. In addition, the drive controller 201 sets the first current threshold for the detected first target current, so that control precision and applicability of the drive controller 201 can be improved.

In some feasible implementations, the sampling circuit 2012 in the drive controller 201 may obtain a second target current value from the second switching transistor Q2 to the first switching transistor Q1. The drive circuit 2011 in the drive controller 201 may turn off the gate inputs of the first switching transistor Q1 and the second switching transistor Q2 when the second target current value is greater than a second current threshold (that is, IR). It may be understood that the drive controller 201 may obtain the second target current value between the second switching transistor Q2 and the first switching transistor Q1 through the sampling circuit 2012. In other words, the second target current value may be detected in half a period in which a current flows from the second switching transistor Q2 to the first switching transistor Q1. When the second target current value is excessively large (that is, exceeds the second target current value), the drive controller 201 may turn off the gate inputs of the first switching transistor Q1 and the second switching transistor Q2 through the drive circuit 2011 (for example, decrease a gate voltage or cut off a gate current) to turn off the first switching transistor Q1 and the second switching transistor Q2, thereby protecting a component in the control system when the second target current is excessively large. In addition, the drive controller 201 sets the second current threshold for the detected second target current, so that control precision and applicability of the drive controller 201 can be improved.

It may be understood that, in the implementations, the drive circuit 2011 and the sampling circuit 2012 in the drive controller 201 are merely an implementation. It may be further understood that the drive circuit 2011 and the sampling circuit 2012 may be two functional modules that have a driving function and a sampling function in the drive controller 201 or may be two functions of a same functional module integrated in the drive controller 201 and are not necessarily two independent circuits. The drive circuit 2011 and the sampling circuit 2012 may also be another circuit having a same or similar function, may be determined based on an actual application scenario, and is not limited herein.

In some feasible implementations, the first switching transistor Q1 and the second switching transistor Q2 include a metal oxide semiconductor field effect transistor MOSFET, a gallium nitride transistor GaN HEMT, or an insulated gate bipolar transistor IGBT. More components and application scenarios are available for the drive controller 201.

In an implementation, the drive controller 201 may obtain the target current value between the first switching transistor Q1 and the second switching transistor Q2 through the sampling circuit 2012. When the current is excessively high, the drive controller 201 may turn off the gate inputs of the first switching transistor Q1 and the second switching transistor Q2 through the drive circuit 2011, to turn off the first switching transistor Q1 and the second switching transistor Q2, thereby protecting the component in the PFC circuit 10 when the current is excessively large. In addition, a sampling function and a driving function are integrated into the drive controller 201. This reduces a quantity of components used to detect a target current and control on and off states of a switching transistor, reduces response time of turning off the switching transistor, reduces design costs and energy loss, and prolongs a service life of a circuit component.

Figure 4:
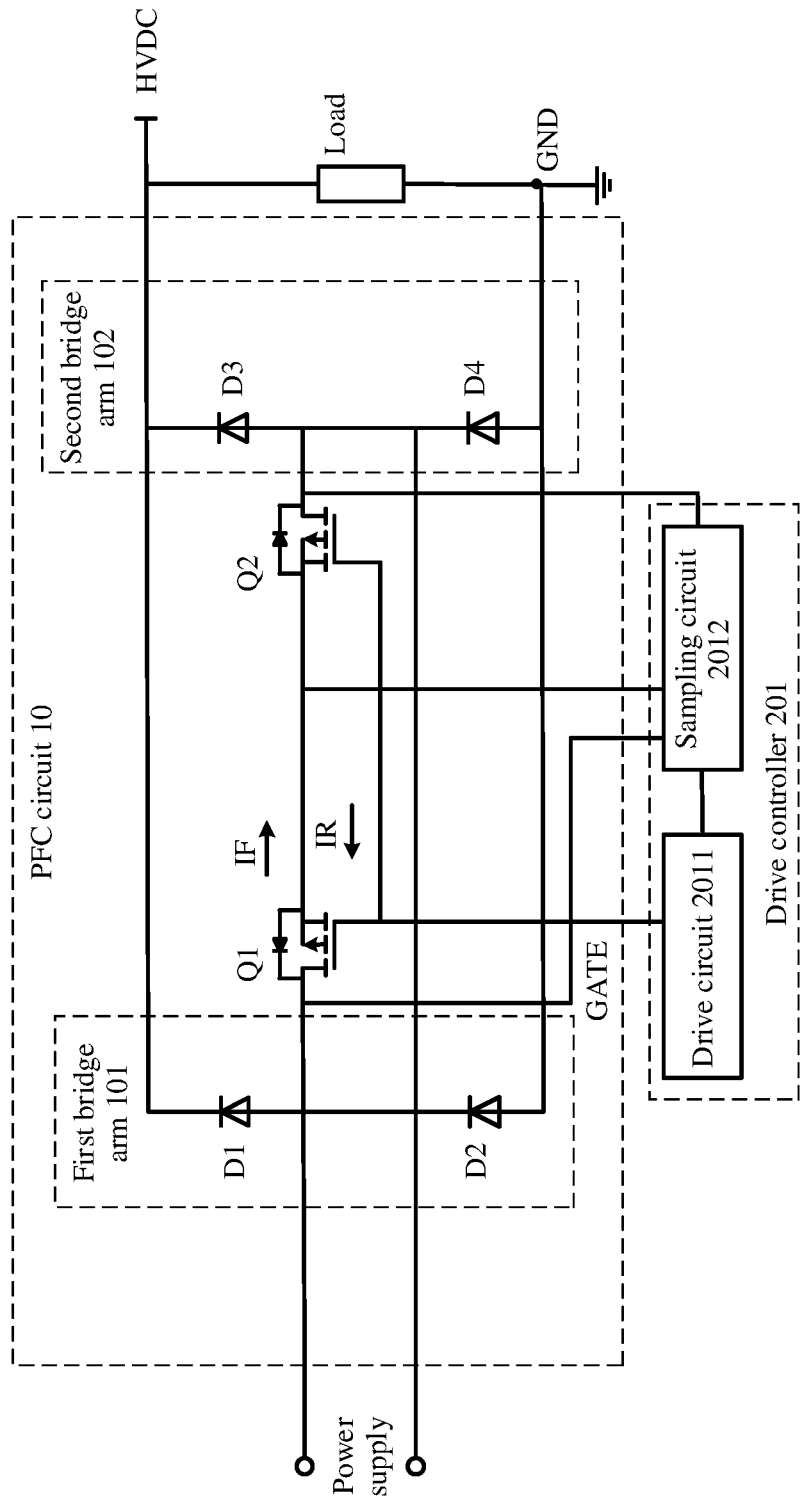
FIG. 4 is a schematic diagram of another structure of a control system according to an embodiment.

In some feasible implementations, the drive controller 201 may detect a voltage between the source electrode and the drain electrode of the first switching transistor Q1 and a voltage between the source electrode and the drain electrode of the second switching transistor Q2, to obtain the target current value between the first switching transistor Q1 and the second switching transistor Q2. FIG. 4 is a schematic diagram of another structure of a control system according to an embodiment. A connection manner of a PFC circuit 10 in FIG. 4 is the same as that of the PFC circuit 10 in FIG. 3, and the PFC circuit 10 in FIG. 4 may implement a function of the PFC circuit 10 in FIG. 3. Details are not described herein again. As shown in FIG. 4, a first connection end of a sampling circuit 2012 in a drive controller 201 is connected to a drain electrode of a first switching transistor Q1. A second connection end of the sampling circuit 2012 in the drive controller 201 is connected to a source electrode of the first switching transistor Q1 and a source electrode of a second switching transistor Q2. A third connection end of the sampling circuit 2012 in the drive controller 201 is connected to a drain electrode of the second switching transistor Q2.

Herein, the sampling circuit 2012 in the drive controller 201 may obtain a first target voltage between the drain electrode of the first switching transistor Q1 and the source electrode of the first switching transistor Q2, and a second target voltage between the drain electrode of the second switching transistor Q2 and the source electrode of the second switching transistor Q2, to obtain a target current value (that is, a ratio of the first target voltage between the drain electrode of the first switching transistor Q1 and the source electrode of the first switching transistor Q1 to an internal resistance value of the first switching transistor Q1, and a ratio of the second target voltage between the drain electrode of the second switching transistor Q2 and the source electrode of the second switching transistor Q2 to an internal resistance of the second switching transistor Q2). When the first target voltage is greater than a first voltage threshold or the second target voltage is greater than a second voltage threshold, the drive controller 201 may turn off gate inputs of the first switching transistor Q1 and the second switching transistor Q2 through a drive circuit 2011 (for example, decrease a gate voltage or cut off a gate current), to turn off the first switching transistor Q1 and the second switching transistor Q2, thereby protecting a component in the control system when a current is excessively high. Herein, the first voltage threshold corresponding to the first target voltage (that is, the voltage between the drain electrode of the first switching transistor and the source electrode of the first switching transistor) may be represented as Vcs1, and a second voltage threshold corresponding to the second target voltage (that is, the voltage between the drain electrode of the second switching transistor and the source electrode of the second switching transistor) may be represented as Vcs2. It may be understood that, when a current flows from the first switching transistor to the second switching transistor, Vcs1=IF*r1, and Vcs2=IF*r2, where r1 is an internal resistance value of the first switching transistor, and r2 is an internal resistance value of the second switching transistor. When a current flows from the second switching transistor to the first switching transistor, Vcs1=IR*r3, Vcs2=IR*r4, where r3 is an internal resistance value of the first switching transistor, and r4 is an internal resistance value of the second switching transistor.

Figure 5A:
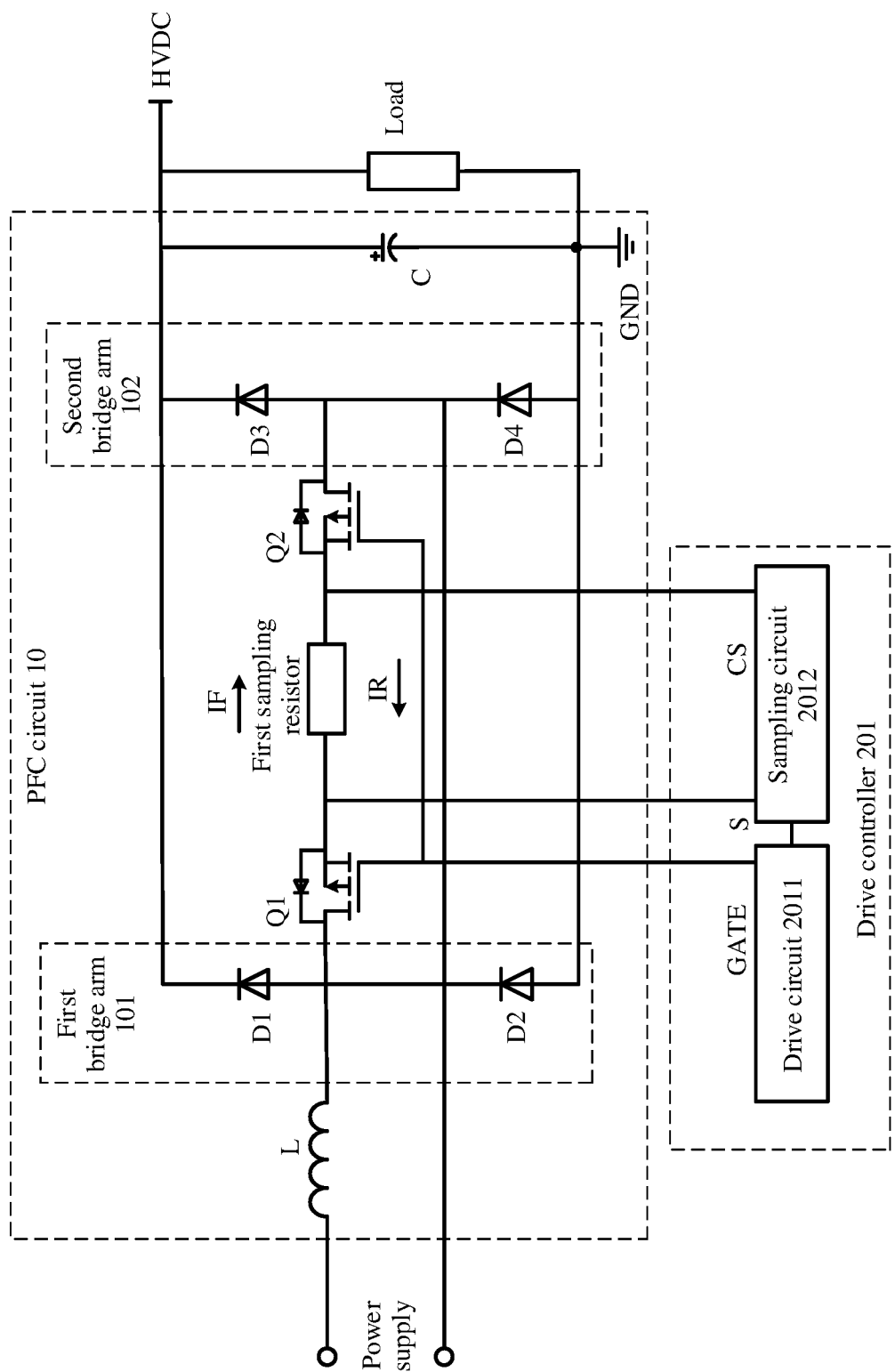
FIG. 5a is a schematic diagram of still another structure of a control system according to an embodiment.

In some feasible implementations, the control system further includes a first detection resistor, and the drive controller 201 may obtain the target current value between the first switching transistor Q1 and the second switching transistor Q2 by detecting a voltage at both ends of the first detection resistor. FIG. 5a is a schematic diagram of another structure of a control system according to an embodiment. A connection manner of a PFC circuit 10 in FIG. 5a is the same as that of the PFC circuit 10 in FIG. 3, and the PFC circuit 10 in FIG. 5a may implement a function of the PFC circuit 10 in FIG. 3. Details are not described herein again. As shown in FIG. 5a, the control system further includes a first detection resistor (herein, a resistance value of the first detection resistor is R1). A source electrode of a first switching transistor Q1 is connected to a source electrode of a second switching transistor Q2 through the first detection resistor. A first connection end of a sampling circuit 2012 in a drive controller 201 is connected to the source electrode of the first switching transistor Q1. A second connection end of the sampling circuit 2012 in the drive controller 201 is connected to a source electrode of a second switching transistor Q2.

Herein, the sampling circuit 2012 in the drive controller 201 may collect a voltage between the source electrode of the first switching transistor Q1 and the source electrode of the second switching transistor Q2, to obtain a target current value between the first switching transistor Q1 and the second switching transistor Q2. When the voltage between the source electrode of the first switching transistor Q1 and the source electrode of the second switching transistor Q2 is greater than a third voltage threshold, a drive circuit 2011 in the drive controller 201 may determine that the target current value is greater than a current threshold and turn off gate inputs of the first switching transistor Q1 and the second switching transistor Q2. Herein, the third voltage threshold between the source electrode of the first switching transistor Q1 and the source electrode of the second switching transistor Q2 may be expressed as Vcs3. It may be understood that when a current flows from the first switching transistor Q1 to the second switching transistor Q2, Vcs3=IF*R1. When a current flows from the second switching transistor Q2 to the first switching transistor Q1, Vcs3=IR*R1.

In some feasible implementations, the first connection end of the sampling circuit 2012 in the drive controller 201 may be an S pin, and the second connection end of the sampling circuit 2012 in the drive controller 201 may be a CS pin. Herein, the S pin is a reference pin, the CS pin is a detection pin, and the reference pin may provide a reference voltage for the detection pin, so that the detection pin can detect a voltage between the reference pin (that is, the S pin) and the detection pin (that is, the CS pin).

Figure 5B:
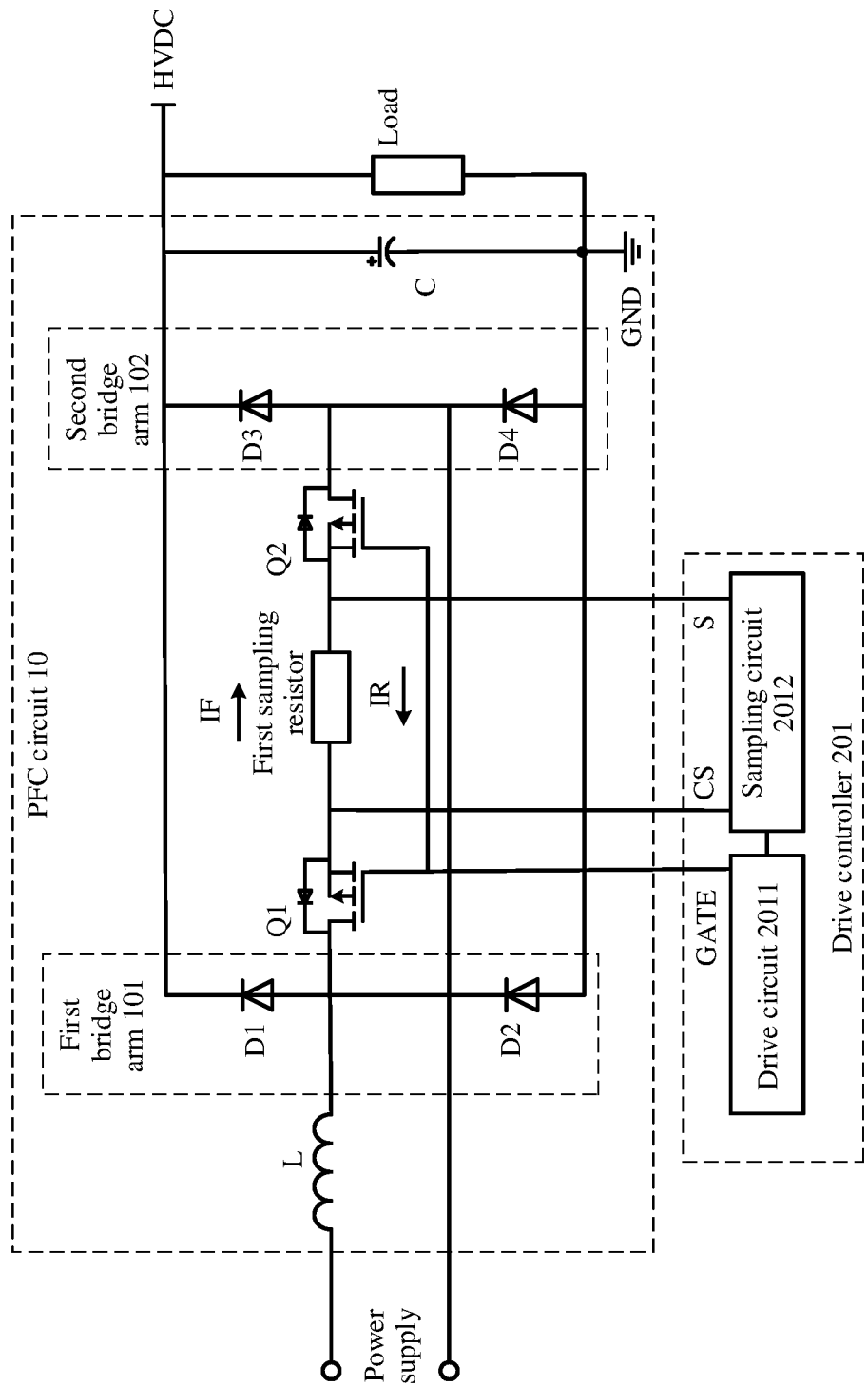
FIG. 5b is a schematic diagram of yet another structure of a control system according to an embodiment.

In some feasible implementations, FIG. 5b is a schematic diagram of another structure of a control system according to an embodiment. As shown in FIG. 5b, a first connection end of a sampling circuit 2012 in a drive controller 201 may be a CS pin, and a second connection end of the sampling circuit 2012 in the drive controller 201 may be an S pin. Herein, the S pin is a reference pin, the CS pin is a detection pin, and the reference pin may provide a reference voltage for the detection pin, so that the detection pin can detect a voltage between the reference pin (that is, the S pin) and the detection pin (that is, the CS pin).

In some feasible implementations, as shown in FIG. 5a and FIG. 5b, the control system may further include an inductor L and a capacitor C. Herein, a first bridge arm midpoint of a first bridge arm 101 is connected to a first connection end of a power supply through the inductor L, a second connection end of the power supply is connected to a second bridge arm midpoint of a second bridge arm 102, and the second bridge arm 102 is connected to the capacitor C in parallel and connected to a load. Herein, the inductor L and the capacitor C may rectify and filter a current in the control system, so that a reactive power loss of electric energy in the control system can be reduced, to improve energy utilization.

In an implementation, the drive controller 201 may obtain, through the sampling circuit 2012, the voltage between the source electrode of the first switching transistor Q1 and the source electrode of the second switching transistor Q2, to obtain the target current value (that is, a ratio of a voltage value between the source electrode of the first switching transistor Q1 and the source electrode of the second switching transistor Q2 to a resistance value of a first detection resistor). When the voltage is excessively high (that is, greater than a third voltage threshold (for example, the third voltage threshold may be Vcs3=IF*R1 or Vcs3=IR*R1)), the drive controller 201 may turn off gate inputs of the first switching transistor Q1 and the second switching transistor Q2 through the drive circuit 2011 (for example, decrease a gate voltage or cut off a gate current), to turn off the first switching transistor Q1 and the second switching transistor Q2, thereby protecting a component in the control system when a current is excessively high. In addition, a sampling function and a driving function are integrated into the drive controller 201. This reduces a quantity of components used to detect a target current and control on and off states of a switching transistor, reduces response time of turning off the switching transistor, reduces design costs and energy loss, and prolongs a service life of a circuit component. In addition, the drive controller 201 detects the voltage between the source electrode of the first switching transistor Q1 and the source electrode of the second switching transistor Q2, to obtain the target current value. This enriches a detection capability of the drive controller 201 and improves applicability of the drive controller 201.

Figure 6A:
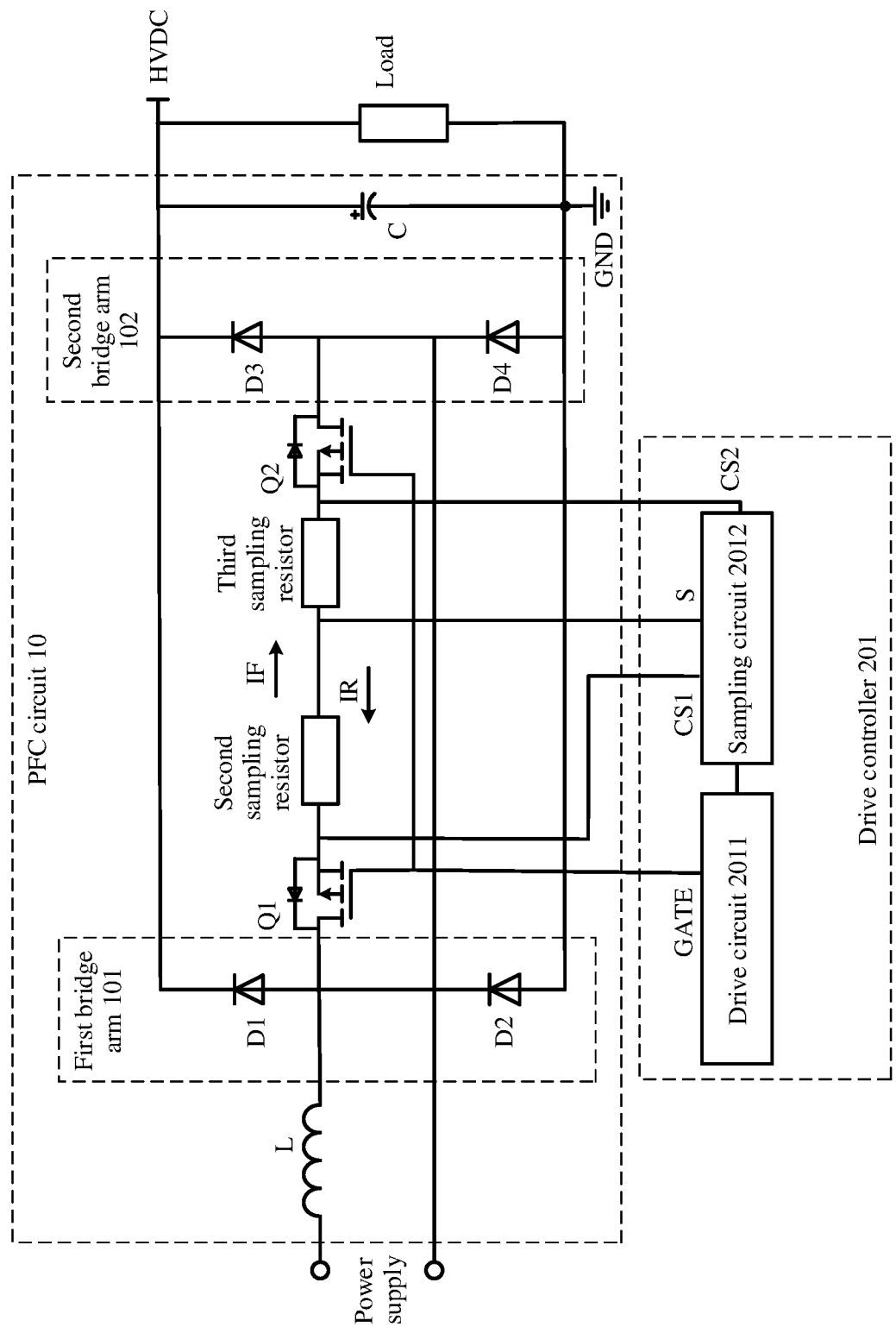
FIG. 6a is a schematic diagram of still yet another structure of a control system according to an embodiment.

FIG. 6a is a schematic diagram of another structure of a control system according to an embodiment. A connection manner of a PFC circuit 10 in FIG. 6a is the same as that of the PFC circuit 10 in FIG. 5a, and the PFC circuit 10 in FIG. 6a may implement a function of the PFC circuit 10 in FIG. 5a. Details are not described herein again. As shown in FIG. 6a, the control system further includes a second detection resistor and a third detection resistor (herein, a resistance value of the second detection resistor is R2, and a resistance value of the third detection resistor is R3). A source electrode of a first switching transistor Q1 is connected to a source electrode of a second switching transistor Q2 through the second detection resistor and the third detection resistor that are connected in series. A first connection end of a sampling circuit 2012 in a drive controller 201 is connected to the source electrode of the first switching transistor Q1. A second connection end of the sampling circuit 2012 in the drive controller 201 is connected to a series connection point of the second detection resistor and the third detection resistor. A third connection end of the sampling circuit 2012 in the drive controller 201 is connected to the source electrode of the second switching transistor Q2.

Herein, the sampling circuit 2012 in the drive controller 201 may collect a third target voltage between the source electrode of the first switching transistor Q1 and the series connection point and collect a fourth target voltage between the source electrode of the second switching transistor Q2 and the series connection point, to obtain a target current value between the first switching transistor Q1 and the second switching transistor Q2. When the third target voltage is greater than a fourth voltage threshold, or the fourth target voltage is greater than a fifth voltage threshold, a drive circuit 2011 in the drive controller 201 may determine that the target current value is greater than a current threshold and turn off gate inputs of the first switching transistor Q1 and the second switching transistor Q2. Herein, the fourth voltage threshold corresponding to the third target voltage (that is, the voltage between the source electrode of the first switching transistor Q1 and the series connection point) may be represented as Vcs4, and the fifth voltage threshold corresponding to the fourth target voltage (that is, the voltage between the source electrode of the second switching transistor Q2 and the series connection point) may be represented as Vcs3. It may be understood that when a current flows from the first switching transistor Q1 to the second switching transistor Q2, Vcs4=IF*R2, and Vcs3=IF*R3. When a current flows from the second switching transistor Q2 to the first switching transistor Q1, Vcs4=IR*R2, Vcs3=IR*R3.

In some feasible implementations, the second connection end of the sampling circuit 2012 in the drive controller 201 may be an S pin, and the first connection end and the third connection end of the sampling circuit 2012 in the drive controller 201 may be CS pins (that is, a CS1 pin and a CS2 pin). Here, the S pin is a reference pin, the CS pins (that is, the CS1 pin and the CS2 pin) are detection pins. The reference pin may provide a reference voltage for the detection pins, so that the detection pins may respectively detect a voltage between the reference pin (that is, the S pin) and the detection pins (that is, the CS1 pin and the CS2 pin).

Figure 6B:
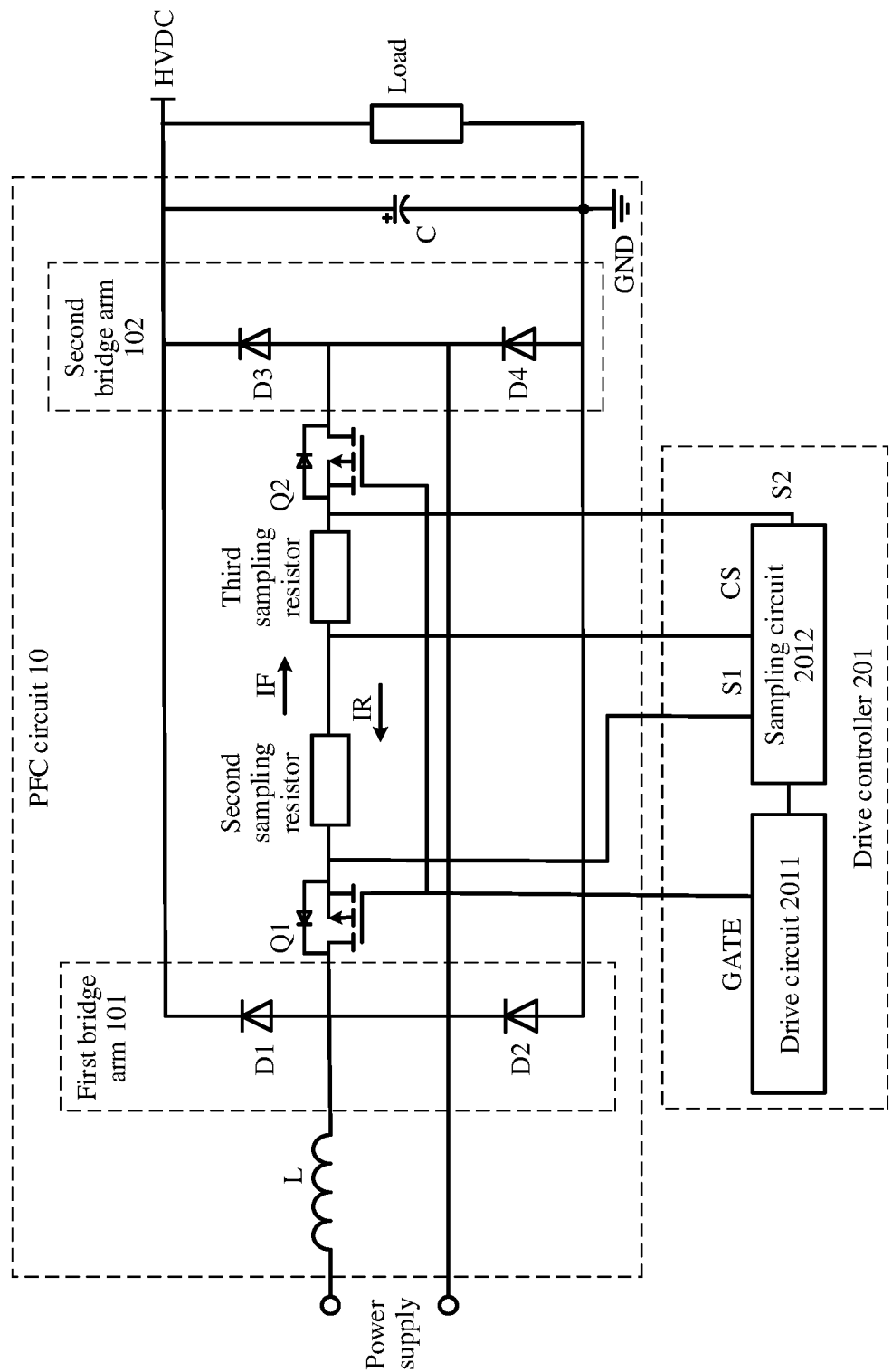
FIG. 6b is a schematic diagram of a further another structure of a control system according to an embodiment.

In some feasible implementations, description is provided with reference to FIG. 6b. FIG. 6b is a schematic diagram of another structure of a control system according to an embodiment. As shown in FIG. 6b, a second connection end of a sampling circuit 2012 in a drive controller 201 may be a CS pin, and a first connection end and a third connection end of the sampling circuit 2012 in the drive controller 201 may be S pins (that is, an S1 pin and an S2 pin). Here, the S pins (that is, the S1 pin and the S2 pin) are reference pins, the CS pin is a detection pin. The reference pins may provide a reference voltage for the detection pin, so that the detection pin can separately detect a voltage between the reference pins (that is, the S1 pin and the S2 pin) and the detection pin (that is, the CS pin).

In some feasible implementations, as shown in FIG. 6a and FIG. 6b, the control system may further include an inductor L and a capacitor C. Herein, a first bridge arm midpoint of a first bridge arm 101 is connected to a first connection end of a power supply through the inductor L, a second connection end of the power supply is connected to a second bridge arm midpoint of a second bridge arm 102, and the second bridge arm 102 is connected to the capacitor C in parallel and connected to a load. Herein, the inductor L and the capacitor C may rectify and filter a current in the control system, so that a reactive power loss of electric energy in the control system can be reduced, to improve energy utilization.

In an implementation, the drive controller 201 may obtain, through the sampling circuit 2012, the third target voltage between the source electrode of the first switching transistor Q1 and the series connection point, and the fourth target voltage between the source electrode of the second switching transistor Q2 and the series connection point, to obtain the target current value (that is, a ratio of the third target voltage between the source electrode of the first switching transistor Q1 and the series connection point to a resistance value of the second detection resistance, and a ratio of the fourth target voltage between the source electrode of the second switching transistor Q2 and the series connection point to a resistance value of the third detection resistance). When the third target voltage is greater than the fourth voltage threshold (for example, the fourth voltage threshold may be Vcs4=IF*R2 or Vcs4=IR*R2) or the fourth target voltage is greater than the fifth voltage threshold. (for example, the fifth voltage threshold may be Vcs3=IF*R3 or Vcs3=IR*R3), the drive controller 201 may turn off the gate inputs of the first switching transistor Q1 and the second switching transistor Q2 through the drive circuit 2011 (for example, decrease the gate voltage or cut the gate current), to turn off the first switching transistor Q1 and the second switching transistor Q2, thereby protecting a component in the control system when a current is excessively high. In addition, a sampling function and a driving function are integrated into the drive controller 201. This reduces a quantity of components used to detect a target current and control on and off states of a switching transistor, reduces response time of turning off the switching transistor, reduces design costs and energy loss, and prolongs a service life of a circuit component. In addition, the drive controller 201 detects the third target voltage between the source electrode of the first switching transistor Q1 and the series connection point, and the fourth target voltage between the source electrode of the second switching transistor Q2 and the series connection point, to further obtain the target current value. This enriches a detection capability of the drive controller 201 and improves applicability of the drive controller 201.

Figure 7:
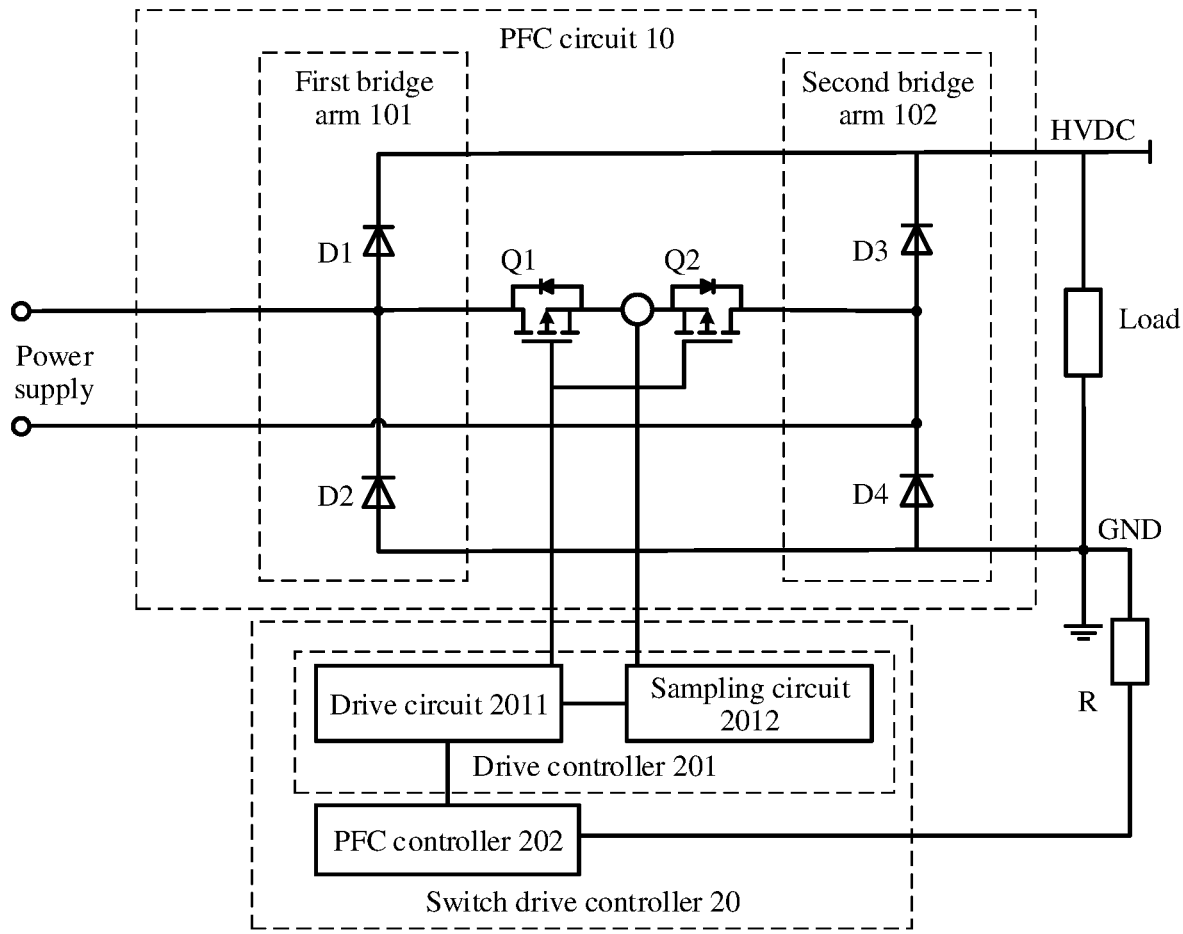
FIG. 7 is a schematic diagram of a still further another structure of a control system according to an embodiment.

In some feasible implementations, the control system may further include a PFC controller. Herein, the drive controller 201 and the PFC controller may be integrated into a switch drive controller 20. Refer to FIG. 7. FIG. 7 is a schematic diagram of another structure of a control system according to an embodiment. A connection manner of a drive controller 201 and a PFC circuit 10 in FIG. 7 is the same as that of the drive controller 201 and the PFC circuit 10 in FIG. 3, and the drive controller 201 and the PFC circuit 10 in FIG. 7 may implement functions of the drive controller 201 and the PFC circuit 10 in FIG. 3. Details are not described herein again. As shown in FIG. 7, a switch drive controller 20 includes a PFC controller 202 and a drive controller 201. The PFC controller 202 is connected to the drive controller 201 and the PFC circuit 10. Herein, as shown in FIG. 7, the PFC controller 202 may also be connected to the PFC circuit 10 through a resistor R.

Herein, the PFC controller 202 may provide a drive signal for the drive controller 201, to control the drive controller 201 to work. It may be understood that, when the PFC circuit works, a drive voltage required by the drive controller 201 is floating with respect to ground. The switch drive controller 20 may provide the drive signal for the drive controller 201 through the PFC controller 202, to control the drive controller 201. This ensures that the drive controller 201 works normally. In addition, because the PFC controller 202 is connected to the PFC circuit 10, a dynamic drive voltage may be provided for the drive controller 201 in real time through the PFC controller 202, thereby reducing a quantity of components used to detect the drive voltage and provide the drive signal and reducing design costs and energy loss. It may be further understood that the PFC controller 202 included in the control system in FIG. 7 may also be used in the control system in any implementation in FIG. 3 to FIG. 6b. A connection manner of the PFC controller 202, the drive controller 201, and the PFC circuit 10, and a function of the PFC controller 202 are similar to those in FIG. 7. Details are not described herein again.

Figure 8:
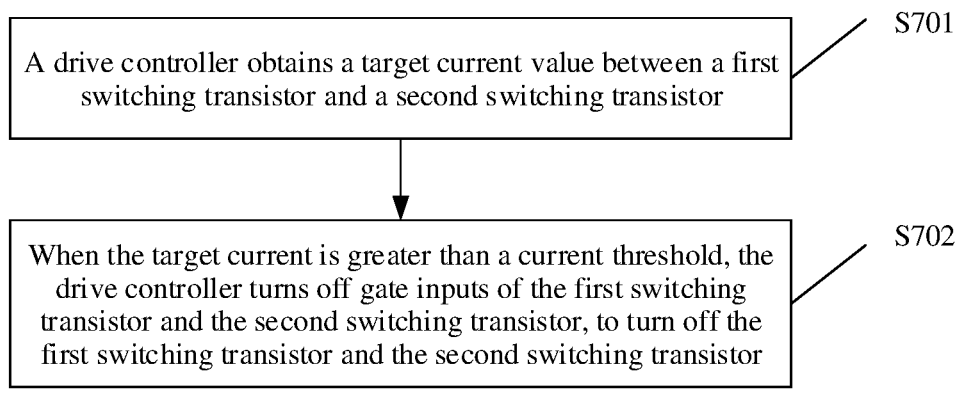
FIG. 8 is a schematic flowchart of a control method according to an embodiment.

FIG. 8 is a schematic flowchart of a control method according to an embodiment. As shown in FIG. 8, the control method is applicable to the drive controller 201 in the control system shown in any one of the foregoing drawings in FIG. 2 to FIG. 7. The control method includes the following steps.

S701: A drive controller 201 obtains a target current value between a first switching transistor and a second switching transistor.

S702: When the target current is greater than a current threshold, the drive controller turns off gate inputs of the first switching transistor and the second switching transistor, to turn off the first switching transistor and the second switching transistor.

In some feasible implementations, the drive controller may obtain a first target current value from the first switching transistor to the second switching transistor. When the first target current value is greater than a first current threshold, the drive controller may turn off the gate inputs of the first switching transistor and the second switching transistor. It may be understood that the drive controller may obtain the first target current value between the first switching transistor and the second switching transistor. In other words, the drive controller may detect the first target current value in half a period in which a current flows from the first switching transistor to the second switching transistor. When the first target current value is excessively large (that is, exceeds the first target current value), the drive controller may turn off the gate inputs of the first switching transistor and the second switching transistor (for example, decrease the gate voltage or cut off the gate current), to turn off the first switching transistor and the second switching transistor, thereby protecting the component in the control system when the first target current is excessively large. In addition, the drive controller sets the first current threshold for the detected first target current, so that control precision and applicability of the drive controller can be improved.

In some feasible implementations, the drive controller may obtain a second target current value from the second switching transistor to the first switching transistor. When the second target current value is greater than a second current threshold, the drive controller may turn off the gate inputs of the first switching transistor and the second switching transistor. It may be understood that the drive controller may obtain the second target current value between the second switching transistor and the first switching transistor. In other words, the second target current value may be detected in half a period in which a current flows from the second switching transistor to the first switching transistor. When the second target current value is excessively large (that is, exceeds the second target current value), the drive controller may turn off the gate inputs of the first switching transistor and the second switching transistor (for example, decrease the gate voltage or cut off the gate current), to turn off the first switching transistor and the second switching transistor, thereby protecting the component in the control system when the second target current is excessively large. In addition, the drive controller sets the second current threshold for the detected second target current, so that the control precision and the applicability of the drive controller can be improved.

In an implementation, the drive controller may obtain the target current value between the first switching transistor and the second switching transistor. When the current is excessively high, the gate inputs of the first switching transistor and the second switching transistor may be turned off (for example, a gate voltage is decreased or a gate current is cut off), to turn off the first switching transistor and the second switching transistor, thereby protecting a component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component.

Figure 9:
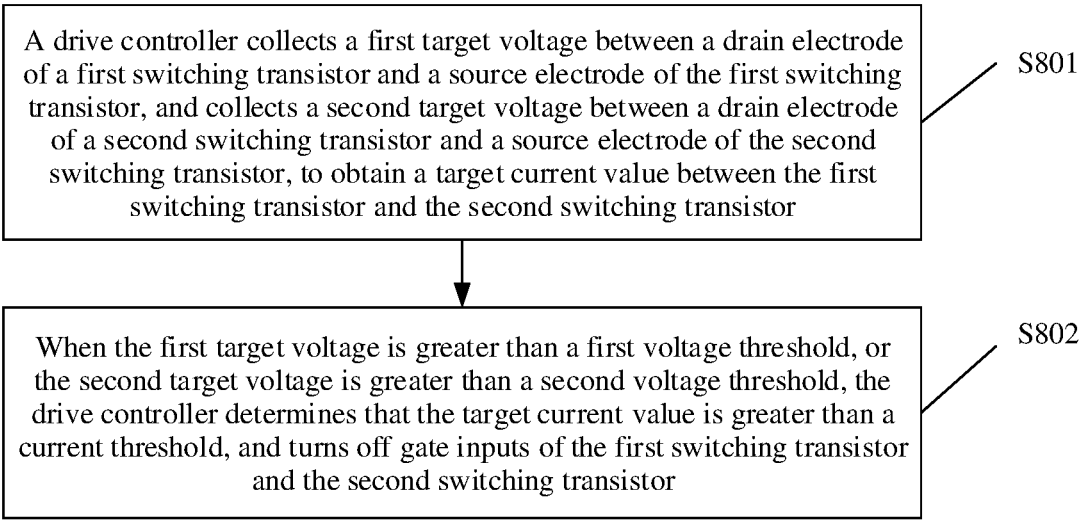
FIG. 9 is a schematic flowchart of another control method according to an embodiment.

In some feasible implementations, as shown in FIG. 4, the drive controller may detect a voltage between the source electrode and the drain electrode of the first switching transistor and a voltage between the source electrode and the drain electrode of the second switching transistor, to obtain the target current value between the first switching transistor and the second switching transistor. FIG. 9 is a schematic flowchart of another control method according to an embodiment. As shown in FIG. 9, the control method includes the following steps.

S801: A drive controller collects a first target voltage between a drain electrode of a first switching transistor and a source electrode of the first switching transistor and collects a second target voltage between a drain electrode of a second switching transistor and a source electrode of the second switching transistor, to obtain a target current value between the first switching transistor and the second switching transistor.

S802: When the first target voltage is greater than a first voltage threshold, or the second target voltage is greater than a second voltage threshold, the drive controller determines that the target current value is greater than a current threshold and turns off gate inputs of the first switching transistor and the second switching transistor.

In some feasible implementations, the drive controller may collect the first target voltage between the drain electrode of the first switching transistor and the source electrode of the first switching transistor, and collect the second target voltage between the drain electrode of the second switching transistor and the source electrode of the second switching transistor, to further calculate a ratio of the first target voltage to an internal resistance value of the first switching transistor and a ratio of the second target voltage to an internal resistance value of the second switching transistor, to obtain the target current value between the first switching transistor and the second switching transistor. When the first target voltage is greater than the first voltage threshold, or the second target voltage is greater than the second voltage threshold, the drive controller may determine that the target current value is greater than the current threshold and decrease gate voltages of the first switching transistor and the second switching transistor or turn off gate currents of the first switching transistor and the second switching transistor. Therefore, the first switching transistor and the second switching transistor are turned off, to protect a component in a PFC circuit. Herein, the first voltage threshold corresponding to the first target voltage (that is, the voltage between the drain electrode of the first switching transistor and the source electrode of the first switching transistor) may be represented as Vcs1, and a second voltage threshold corresponding to the second target voltage (that is, the voltage between the drain electrode of the second switching transistor and the source electrode of the second switching transistor) may be represented as Vcs2. It may be understood that, when a current flows from the first switching transistor to the second switching transistor, Vcs1=IF*r1, and Vcs2=IF*r2, where r1 is an internal resistance value of the first switching transistor in this case, and r2 is an internal resistance value of the second switching transistor in this case. When a current flows from the second switching transistor to the first switching transistor, Vcs1=IR*r3, Vcs2=IR*r4, where r3 is an internal resistance value of the first switching transistor in this case, and r4 is an internal resistance value of the second switching transistor in this case.

In an implementation, the drive controller may obtain the first target voltage between the drain electrode of the first switching transistor and the source electrode of the first switching transistor, and the second target voltage between the drain electrode of the second switching transistor and the source electrode of the second switching transistor, to obtain the target current value (that is, a ratio of the first target voltage between the drain electrode of the first switching transistor and the source electrode of the first switching transistor to an internal resistance value of the first switching transistor, and a ratio of the second target voltage between the drain electrode of the second switching transistor and the source electrode of the second switching transistor to an internal resistance of the second switching transistor). When the first target voltage is greater than the first voltage threshold (for example, the first voltage threshold may be Vcs1=IF*r1 or Vcs1=IR*r3) or the second target voltage is greater than the second voltage threshold (for example, the second voltage threshold may be Vcs2=IF*r2 or Vcs2=IR*r4), the drive controller may turn off the gate inputs of the first switching transistor and the second switching transistor (for example, decrease the gate voltage or cut the gate current), to turn off the first switching transistor and the second switching transistor, thereby protecting a component in the control system when a current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the first target voltage between the drain electrode of the first switching transistor and the source electrode of the first switching transistor, and the second target voltage between the drain electrode of the second switching transistor and the source electrode of the second switching transistor, to obtain the target current value. This enriches a detection capability of the drive controller and improves applicability of the drive controller.

Figure 10:
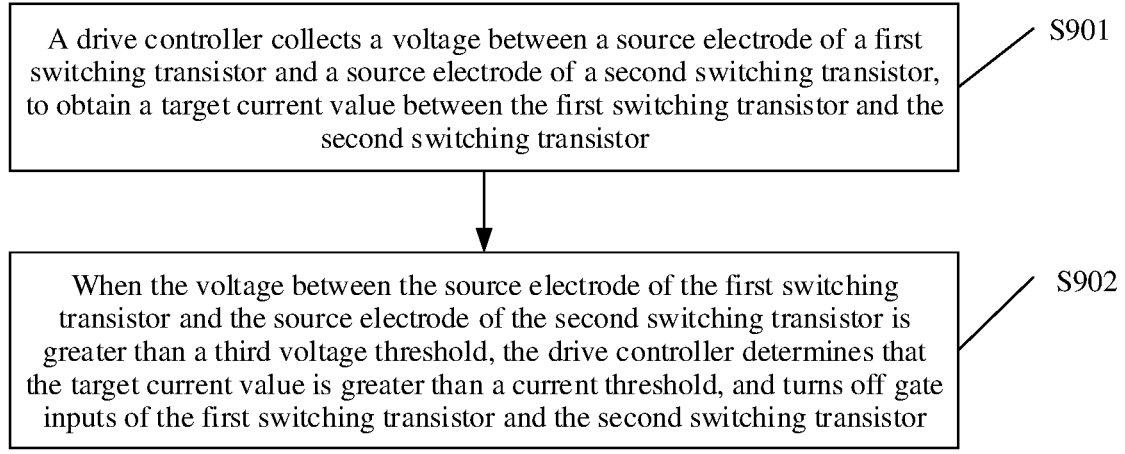
FIG. 10 is a schematic flowchart of still another control method according to an embodiment.

In some feasible implementations, as shown in FIG. 5a and FIG. 5b, when the control system includes the first detection resistor, the drive controller may further obtain the target current value between the first switching transistor and the second switching transistor by detecting a voltage at both ends of the first detection resistor. FIG. 10 is a schematic flowchart of another control method according to an embodiment. As shown in FIG. 10, the control method includes the following steps.

S901: A drive controller collects a voltage between a source electrode of a first switching transistor and a source electrode of a second switching transistor, to obtain a target current value between the first switching transistor and the second switching transistor.

S902: When the voltage between the source electrode of the first switching transistor and the source electrode of the second switching transistor is greater than a third voltage threshold, the drive controller determines that the target current value is greater than a current threshold and turns off gate inputs of the first switching transistor and the second switching transistor.

In some feasible implementations, the drive controller may collect the voltage between the source electrode of the first switching transistor and the source electrode of the second switching transistor, to further calculate a ratio of the voltage between the source electrode of the first switching transistor and the source electrode of the second switching transistor to a first detection resistance value, and obtain the target current value between the first switching transistor and the second switching transistor. When the voltage between the source electrode of the first switching transistor and the source electrode of the second switching transistor is greater than the third voltage threshold, the drive controller may determine that the target current value is greater than the current threshold and decrease gate voltages of the first switching transistor and the second switching transistor or turn off gate currents of the first switching transistor and the second switching transistor. Therefore, the first switching transistor and the second switching transistor are turned off, to protect a component in a PFC circuit. Herein, the third voltage threshold between the source electrode of the first switching transistor and the source electrode of the second switching transistor may be expressed as Vcs3. It may be understood that when a current flows from the first switching transistor Q1 to the second switching transistor Q2, Vcs3=IF*R1. When a current flows from the second switching transistor Q2 to the first switching transistor Q1, Vcs3=IR*R1.

In an implementation, the drive controller may obtain the voltage between the source electrode of the first switching transistor and the source electrode of the second switching transistor, to obtain the target current value (that is, a ratio of a voltage value between the source electrode of the first switching transistor Q1 and the source electrode of the second switching transistor Q2 to a resistance value of a first detection resistor). When the voltage is excessively high (that is, greater than the third voltage threshold (for example, the third voltage threshold may be Vcs3=IF*R1 or Vcs3=IR*R1)), the drive controller may turn off the gate inputs of the first switching transistor and the second switching transistor (for example, decrease the gate voltage or cut off the gate current), to turn off the first switching transistor and the second switching transistor, thereby protecting the component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the voltage between the source electrode of the first switching transistor and the source electrode of the second switching transistor, to obtain the target current value. This enriches the detection capability of the drive controller and improves the applicability of the drive controller.

Figure 11:
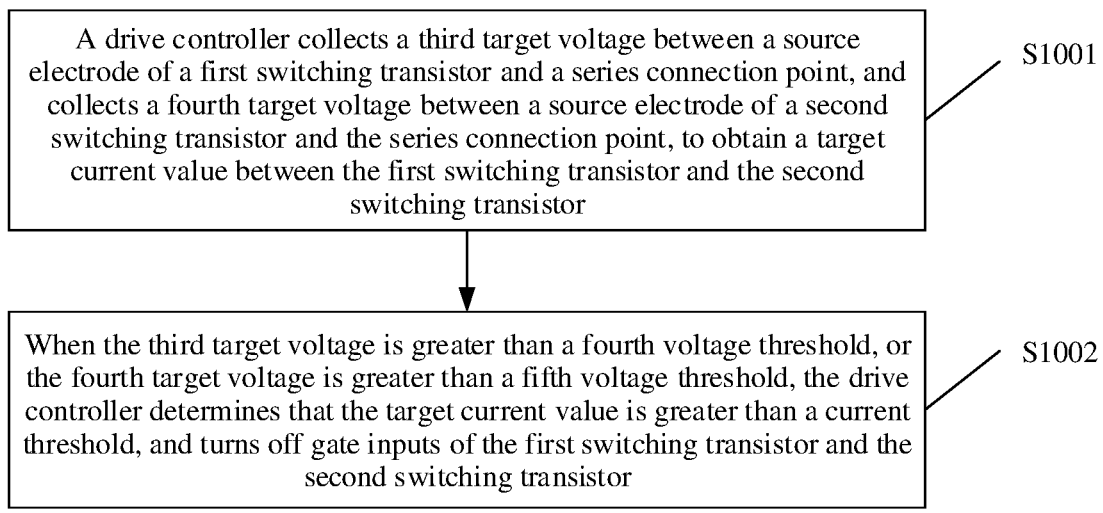
FIG. 11 is a schematic flowchart of yet another control method according to an embodiment.

In some feasible implementations, as shown in FIG. 6a and FIG. 6b, when the control system includes the second detection resistor and the third detection resistor, the drive controller may further obtain the target current value between the first switching transistor and the second switching transistor by detecting voltages at both ends of the second detection resistor and voltages at both ends of the third detection resistor. FIG. 11 is a schematic flowchart of another control method according to an embodiment. As shown in FIG. 11, the control method includes the following steps.

S1001: A drive controller collects a third target voltage between a source electrode of a first switching transistor and a series connection point and collects a fourth target voltage between a source electrode of a second switching transistor and the series connection point, to obtain a target current value between the first switching transistor and the second switching transistor.

S1002: When the third target voltage is greater than a fourth voltage threshold, or the fourth target voltage is greater than a fifth voltage threshold, the drive controller determines that the target current value is greater than a current threshold and turns off gate inputs of the first switching transistor and the second switching transistor.

In some feasible implementations, the drive controller may collect the third target voltage between the source electrode of the first switching transistor and the series connection point, and collect the fourth target voltage between the source electrode of the second switching transistor and the series connection point, to further calculate a ratio of the third target voltage to a second detection resistance value, and a ratio of the fourth target voltage to a third detection resistance value, to obtain the target current value between the first switching transistor and the second switching transistor. When the third target voltage is greater than the fourth voltage threshold, or the fourth target voltage is greater than the fifth voltage threshold, the drive controller may determine that the target current value is greater than the current threshold and decrease gate voltages of the first switching transistor and the second switching transistor or turn off gate currents of the first switching transistor and the second switching transistor. Therefore, the first switching transistor and the second switching transistor are turned off, to protect a component in a PFC circuit. Herein, the fourth voltage threshold corresponding to the third target voltage (that is, the voltage between the source electrode of the first switching transistor and the series connection point) may be represented as $Vcs4$, and the fifth voltage threshold corresponding to the fourth target voltage (that is, the voltage between the source electrode of the second switching transistor and the series connection point) may be represented as $Vcs3$. It may be understood that when a current flows from the first switching transistor to the second switching transistor, $Vcs4=IF*R2$, and $Vcs3=IF*R3$. When a current flows from the second switching transistor to the first switching transistor, $Vcs4=IR*R2$, $Vcs3=IR*R3$.

In an implementation, the drive controller may obtain the third target voltage between the source electrode of the first switching transistor and the series connection point, and the fourth target voltage between the source electrode of the second switching transistor and the series connection point, to obtain the target current value (that is, a ratio of the third target voltage between the source electrode of the first switching transistor and the series connection point to a resistance value of the second detection resistance, and a ratio of the fourth target voltage between the source electrode of the second switching transistor and the series connection point to a resistance value of the third detection resistance). When the third target voltage is greater than the fourth voltage threshold (for example, the fourth voltage threshold may be $Vcs4=IF*R2$ or $Vcs4=IR*R2$) or the fourth target voltage is greater than the fifth voltage threshold. (for example, the fifth voltage threshold may be $Vcs3=IF*R3$ or $Vcs3=IR*R3$), the drive controller may turn off the gate inputs of the first switching transistor and the second switching transistor (for example, decrease the gate voltage or cut the gate current), to turn off the first switching transistor and the second switching transistor, thereby protecting the component in the control system when the current is excessively high. In addition, a sampling function and a driving function are integrated into the drive controller. This reduces a quantity of components used to detect a target current and control on and off states of a switching transistor, reduces response time of turning off the switching transistor, reduces design costs and energy loss, and prolongs a service life of a circuit component. In addition, the drive controller detects the third target voltage between the source electrode of the first switching transistor and the series connection point, and the fourth target voltage between the source electrode of the second switching transistor and the series connection point, to further obtain the target current value. This enriches the detection capability of the drive controller and improves the applicability of the drive controller.

The foregoing descriptions are merely implementations, but are not intended to limit the scope of the embodiments. Any variation or replacement readily figured out by a person skilled in the art shall be within the scope of the embodiments.

What is claimed is:

1. A drive controller comprising:
 a sampling circuit; and
 a drive circuit, wherein the drive controller is applicable to a control system further comprising a power factor correction (PFC) circuit that comprises
  a first bridge arm,
  a second bridge arm,
  a first switching transistor, and
  a second switching transistor, the first bridge arm and the second bridge arm are connected in parallel and connected to a load, a first bridge arm midpoint of the first bridge arm is connected to a power supply and a drain electrode of the first switching transistor, a drain electrode of the second switching transistor is connected to a second bridge arm midpoint of the second bridge arm, a source electrode of the first switching transistor is connected to a source electrode of the second switching transistor and the sampling circuit, a gate electrode of the first switching transistor and a gate electrode of the second switching transistor are connected in parallel to the drive circuit, and the sampling circuit is connected to the drive circuit; the sampling circuit is configured to obtain a target current value between the first switching transistor and the second switching transistor; and the drive circuit is configured to turn off gate inputs of the first switching transistor and the second switching transistor when the target current value is greater than a current threshold.

2. The drive controller according to claim 1, wherein the sampling circuit is further configured to obtain a first target current value from the first switching transistor to the second switching transistor; and the drive circuit is further configured to turn off the gate inputs of the first switching transistor and the second switching transistor when the first target current value is greater than a first current threshold.

3. The drive controller according to claim 1, wherein the sampling circuit is further configured to obtain a second target current value from the second switching transistor to the first switching transistor; and the drive circuit is further configured to turn off the gate inputs of the first switching transistor and the second switching transistor when the second target current value is greater than a second current threshold.

4. The drive controller according to claim 2, wherein the sampling circuit is further configured to obtain a second target current value from the second switching transistor to the first switching transistor; and the drive circuit is further configured to turn off the gate inputs of the first switching transistor and the second switching transistor when the second target current value is greater than a second current threshold.

5. The drive controller according to claim 1, wherein a first connection end of the sampling circuit is connected to the drain electrode of the first switching transistor, a second connection end of the sampling circuit is connected to the source electrode of the first switching transistor and the source electrode of the second switching transistor, a third connection end of the sampling circuit is connected to the drain electrode of the second switching transistor, the sampling circuit is further configured to;
collect a first target voltage between the drain electrode of the first switching transistor and the source electrode of the first switching transistor, and collect a second target voltage between the drain electrode of the second switching transistor and the source electrode of the second switching transistor, to obtain the target current value between the first switching transistor and the second switching transistor, and the drive circuit is further configured to:
when the first target voltage is greater than a first voltage threshold, or the second target voltage is greater than a second voltage threshold, determine that the target current value is greater than a current threshold, and turn off the gate inputs of the first switching transistor and the second switching transistor.

6. The drive controller according to claim 1, wherein the control system further comprises:
a first detection resistor, the source electrode of the first switching transistor is connected to the source electrode of the second switching transistor through the first detection resistor, the first connection end of the sampling circuit is connected to the source electrode of the first switching transistor, and the second connection end of the sampling circuit is connected to the source electrode of the second switching transistor,; the sampling circuit is further configured to:
collect a voltage between the source electrode of the first switching transistor and the source electrode of the second switching transistor, to obtain the target current value between the first switching transistor and the second switching transistor,; and the drive circuit is further configured to:
when the voltage between the source electrode of the first switching transistor and the source electrode of the second switching transistor is greater than a third voltage threshold, determine that the target current value is greater than the current threshold, and turn off the gate inputs of the first switching transistor and the second switching transistor.

7. The drive controller according to claim 1, further comprising:
a second detection resistor; and
a third detection resistor, wherein the source electrode of the first switching transistor is connected to the source electrode of the second switching transistor through the second detection resistor and the third detection resistor that are connected in series, the first connection end of the sampling circuit is connected to the source electrode of the first switching transistor, the second connection end of the sampling circuit is connected to a series connection point of the second detection resistor and the third detection resistor, and the third connection end of the sampling circuit is connected to the source electrode of the second switching transistor,; the sampling circuit is further configured to:
collect a third target voltage between the source electrode of the first switching transistor and the series connection point, and collect a fourth target voltage between the source electrode of the second switching transistor and the series connection point, to obtain the target current value between the first switching transistor and the second switching transistor,; and the drive circuit is configured to:
when the third target voltage is greater than a fourth voltage threshold, or the fourth target voltage is greater than a fifth voltage threshold, determine that the target current value is greater than the current threshold and turn off the gate inputs of the first switching transistor and the second switching transistor.

8. The drive controller according to claim 1, wherein the first switching transistor and the second switching transistor comprise a metal oxide semiconductor field effect transistor (MOSFET), a gallium nitride transistor GaN HEMT, or an insulated gate bipolar transistor (IGBT).

9. A switch drive controller of a power factor correction (PFC) circuit, wherein the switch drive controller comprises a PFC controller and the drive controller according to claim 1, the PFC controller is connected to the PFC circuit and the drive controller, and the PFC controller is configured to provide a drive signal for the drive controller.

10. A control system of a power factor correction circuit, the control system comprising:
a power factor correction (PFC) circuit;
a PFC controller; and
a drive controller applicable to a control system of a power factor correction circuit, wherein the PFC circuit further comprises:
a first bridge arm,
a second bridge arm,
a first switching transistor, and
a second switching transistor, and the drive controller further comprises:
a sampling circuit, and
a drive circuit, the first bridge arm and the second bridge arm are connected in parallel and connected to a load, a first bridge arm midpoint of the first bridge arm is connected to a power supply and a drain electrode of the first switching transistor, a drain electrode of the second switching transistor is connected to a second bridge arm midpoint of the second bridge arm, a source electrode of the first switching transistor is connected to a source electrode of the second switching transistor and the sampling circuit, a gate electrode of the first switching transistor and a gate electrode of the second switching transistor are connected in parallel to the drive circuit, and the sampling circuit is connected to the drive circuit, the sampling circuit is further configured to:

obtain a target current value between the first switching transistor and the second switching transistor,; and the drive circuit is further configured to:
turn off gate inputs of the first switching transistor and the second switching transistor when the target current value is greater than a current threshold, the PFC controller is connected to the PFC circuit and the drive controller and is configured to provide a drive signal for the drive controller.

11. The control system according to claim 10, wherein the control system further comprises: an inductor; and
a capacitor, the first bridge arm midpoint of the first bridge arm is connected to a first connection end of the power supply through the inductor, a second connection end of the power supply is connected to the second bridge arm midpoint of the second bridge arm, and the second bridge arm is connected to the capacitor in parallel and connected to the load.

12. A control method applicable to a drive controller and according, the drive controller is applicable to a control system comprising a power factor correction (PFC) circuit comprising
a first bridge arm,
a second bridge arm,
a first switching transistor, and
a second switching transistor, the drive controller comprises
a sampling circuit and
a drive circuit, the first bridge arm and the second bridge arm are connected in parallel and connected to a load, a first bridge arm midpoint of the first bridge arm is connected to a power supply and a drain electrode of the first switching transistor, a drain electrode of the second switching transistor is connected to a second bridge arm midpoint of the second bridge arm, a source electrode of the first switching transistor is connected to a source electrode of the second switching transistor and the sampling circuit, a gate electrode of the first switching transistor and a gate electrode of the second switching transistor are connected in parallel to the drive circuit, and the sampling circuit is connected to the drive circuit, comprising:
obtaining, by the drive controller, a target current value between the first switching transistor and the second switching transistor; and
turning off, by the drive controller, gate inputs of the first switching transistor and the second switching transistor when the target current is greater than a current threshold.

13. The method according to claim 12, further comprising:
obtaining, by the drive controller, a first target current value from the first switching transistor to the second switching transistor; and
turning off, by the drive controller, the gate inputs of the first switching transistor and the second switching transistor when the first target current value is greater than a first current threshold.

14. The method according to claim 12, further comprising:
obtaining, by the drive controller, a second target current value from the second switching transistor to the first switching transistor; and
turning off, by the drive controller, the gate inputs of the first switching transistor and the second switching transistor when the second target current value is greater than a second current threshold.

15. The method according to claim 13, further comprising:
obtaining, by the drive controller, a second target current value from the second switching transistor to the first switching transistor; and
turning off, by the drive controller, the gate inputs of the first switching transistor and the second switching transistor when the second target current value is greater than a second current threshold.

16. The method according to claim 12, further comprising:
collecting, by the drive controller, a first target voltage between a drain electrode of the first switching transistor and a source electrode of the first switching transistor, and collecting a second target voltage between a drain electrode of the second switching transistor and a source electrode of the second switching transistor, to obtain the target current value between the first switching transistor and the second switching transistor; and when the first target voltage is greater than a first voltage threshold, or the second target voltage is greater than a second voltage threshold,
determining, by the drive controller, that the target current value is greater than a current threshold, and
turning off the gate inputs of the first switching transistor and the second switching transistor.

17. The method according to claim 12, wherein when the control system further comprises a first detection resistor, the method further comprises:
collecting, by the drive controller, a voltage between the source electrode of the first switching transistor and the source electrode of the second switching transistor, to obtain the target current value between the first switching transistor and the second switching transistor; and when the voltage between the source electrode of the first switching transistor and the source electrode of the second switching transistor is greater than a third voltage threshold,
determining, by the drive controller, that the target current value is greater than the current threshold, and
turning off the gate inputs of the first switching transistor and the second switching transistor.

18. The method according to claim 12, wherein when the control system further comprises a second detection resistor and a third detection resistor, the method further comprises:
collecting, by the drive controller, a third target voltage between the source electrode of the first switching transistor and a series connection point; and
collecting a fourth target voltage between the source electrode of the second switching transistor and the series connection point, to obtain the target current value between the first switching transistor and the second switching transistor; and
when the first target voltage is greater than a fourth voltage threshold, or the fourth target voltage is greater than a fifth voltage threshold,
determining, by the drive controller, that the target current value is greater than the current threshold, and
turning off the gate inputs of the first switching transistor and the second switching transistor.

* * * * *